United States Patent
Lyalin et al.

(10) Patent No.: US 12,537,487 B2
(45) Date of Patent: Jan. 27, 2026

(54) POWER AMPLIFIER SYSTEM WITH REDUCED GAIN VARIATION FOR ENVELOPE TRACKING APPLICATIONS

(71) Applicant: Skyworks Solutions, Inc., Irvine, CA (US)

(72) Inventors: Aleksey A. Lyalin, Moorpark, CA (US); Brian John Bayuk, Cedar Rapids, IA (US)

(73) Assignee: Skyworks Solutions, Inc., Irvine, CA (US)

( * ) Notice: Subject to any disclaimer, the term of this patent is extended or adjusted under 35 U.S.C. 154(b) by 623 days.

(21) Appl. No.: 17/937,732

(22) Filed: Oct. 3, 2022

(65) Prior Publication Data

US 2023/0105489 A1 Apr. 6, 2023

Related U.S. Application Data

(60) Provisional application No. 63/251,969, filed on Oct. 4, 2021.

(51) Int. Cl.
*H03F 3/24* (2006.01)
*H03F 1/02* (2006.01)
(Continued)

(52) U.S. Cl.
CPC ........... *H03F 3/245* (2013.01); *H03F 1/0227* (2013.01); *H03F 3/26* (2013.01); *H03F 3/265* (2013.01);
(Continued)

(58) Field of Classification Search
CPC .......... H03F 3/245; H03F 1/0227; H03F 3/26; H03F 3/265; H03F 2200/06;
(Continued)

(56) References Cited

U.S. PATENT DOCUMENTS 3,835,406 A 9/1974 Thompson
5,847,626 A 12/1998 Taguchi et al.
(Continued)

OTHER PUBLICATIONS

Ho, M., Guo, J., Mui, T.W., Mak, K.H., Goh, W.L., Poon, H.C., Bu, S., Lau, M.W. and Leung, K.N., 2016. A two-stage large-capacitive-load amplifier with multiple cross-coupled small-gain stages. IEEE Transactions on Very Large Scale Integration (VLSI) Systems, 24(7), pp. 2580-259.

(Continued)

*Primary Examiner* — Hieu P Nguyen
(74) *Attorney, Agent, or Firm* — Knobbe, Martens, Olson & Bear, LLP

(57) ABSTRACT

A power amplifier system for amplifying a radio frequency signal can have a driver transistor coupled to a radio frequency signal input. The system can also have a transformer balun with a main primary coil connected between the driver transistor and a voltage supply node of the power amplifier system, a secondary coil magnetically coupled to the main primary coil, and an additional primary coil configured to generate a feedback signal related to a signal induced in the main primary coil. A neutralization diode can be configured to use the feedback signal to reduce a gain variation resulting from variations in a voltage supplied from the voltage supply node of the power amplifier system. The neutralization diode can be connected between the additional primary coil and the driver transistor. Through envelope tracking, voltage supplied through the voltage supply node can change in relation to an envelope of the radio frequency signal.

21 Claims, 13 Drawing Sheets

(51) Int. Cl.
*H03F 3/26* (2006.01)
*H04B 1/40* (2015.01)

(52) U.S. Cl.
CPC ............ *H04B 1/40* (2013.01); *H03F 2200/06* (2013.01); *H03F 2200/102* (2013.01); *H03F 2200/117* (2013.01); *H03F 2200/216* (2013.01); *H03F 2200/451* (2013.01); *H03F 2200/537* (2013.01)

(58) Field of Classification Search
CPC ......... H03F 2200/102; H03F 2200/117; H03F 2200/216; H03F 2200/451; H03F 2200/537; H03F 2200/534; H03F 2200/541; H04B 1/40
USPC .............................. 330/310, 295, 124 R, 301
See application file for complete search history.

(56) References Cited

U.S. PATENT DOCUMENTS

| | | | |
|---|---|---|---|
| 5,983,340 | A | 11/1999 | Garey et al. |
| 6,151,509 | A | 11/2000 | Chorey |
| 6,529,716 | B1 | 3/2003 | Eidson et al. |
| 6,559,722 | B1 | 5/2003 | Lopez et al. |
| 6,681,101 | B1 | 1/2004 | Eidson et al. |
| 6,822,511 | B1 | 11/2004 | Doherty et al. |
| 6,825,725 | B1 | 11/2004 | Doherty et al. |
| 6,882,220 | B2 | 4/2005 | Doherty et al. |
| 6,917,243 | B2 | 7/2005 | Doherty et al. |
| 6,937,102 | B2 | 8/2005 | Lopez et al. |
| 6,998,920 | B2 | 2/2006 | Krutko et al. |
| 7,385,447 | B1 | 6/2008 | Adar |
| 7,471,154 | B2 | 12/2008 | Thompson |
| 7,482,868 | B2 | 1/2009 | Hageman et al. |
| 7,545,217 | B1 | 6/2009 | Reyes |
| 8,350,418 | B2 | 1/2013 | Metzger et al. |
| 8,514,016 | B2 | 8/2013 | Ripley et al. |
| 8,666,337 | B2 | 3/2014 | Ripley et al. |
| 9,048,284 | B2 | 6/2015 | Mcpartlin et al. |
| 9,083,455 | B2 | 7/2015 | Popplewell et al. |
| 9,093,967 | B2 | 7/2015 | Gorbachov |
| 9,246,443 | B2 | 1/2016 | Shi et al. |
| 9,344,140 | B2 | 5/2016 | Reisner et al. |
| 9,391,648 | B2 | 7/2016 | Popplewell et al. |
| 9,419,073 | B2 | 8/2016 | Mcpartlin et al. |
| 9,425,833 | B2 | 8/2016 | Popplewell et al. |
| 9,429,975 | B2 | 8/2016 | Alon et al. |
| 9,450,541 | B2 | 9/2016 | Beltran et al. |
| 9,467,115 | B2 | 10/2016 | Lyalin |
| 9,571,139 | B2 | 2/2017 | Alon et al. |
| 9,628,134 | B2 | 4/2017 | Reisner et al. |
| 9,660,600 | B2 | 5/2017 | Whittaker |
| 9,660,606 | B2 | 5/2017 | Lyalin et al. |
| 9,698,832 | B2 | 7/2017 | Popplewell et al. |
| 9,712,119 | B2 | 7/2017 | Datta et al. |
| 9,761,700 | B2 | 9/2017 | Mcpartlin |
| 9,768,740 | B2 | 9/2017 | Zhang et al. |
| 9,800,207 | B2 | 10/2017 | Datta et al. |
| 9,813,029 | B2 | 11/2017 | Zhu et al. |
| 9,818,821 | B2 | 11/2017 | Mcpartlin et al. |
| 9,837,972 | B2 | 12/2017 | Arkiszewski et al. |
| 9,853,610 | B2 | 12/2017 | Beltran et al. |
| 9,882,587 | B2 | 1/2018 | Feng et al. |
| 9,887,669 | B2 | 2/2018 | Shi et al. |
| 9,912,298 | B2 | 3/2018 | Lyalin et al. |
| 9,912,299 | B2 | 3/2018 | Lyalin |
| 9,935,593 | B2 | 4/2018 | Lyalin |
| 10,033,423 | B2 | 7/2018 | Reisner et al. |
| 10,103,254 | B2 | 10/2018 | Mcpartlin |
| 10,110,183 | B2 | 10/2018 | Lyalin et al. |
| 10,110,184 | B2 | 10/2018 | Lyalin et al. |
| 10,177,838 | B2 | 1/2019 | Ripley |
| 10,205,426 | B2 | 2/2019 | Zhu et al. |
| 10,263,072 | B2 | 4/2019 | Mcpartlin et al. |
| 10,263,594 | B2 | 4/2019 | Lyalin et al. |
| 10,284,153 | B2 | 5/2019 | Quaglietta et al. |
| 10,291,185 | B2 | 5/2019 | Lyalin et al. |
| 10,320,345 | B2 | 6/2019 | Sharma et al. |
| 10,355,647 | B2 | 7/2019 | Datta et al. |
| 10,355,724 | B2 | 7/2019 | Feng et al. |
| 10,411,662 | B2 | 9/2019 | Lyalin et al. |
| 10,418,945 | B2 | 9/2019 | Whittaker |
| 10,469,316 | B2 | 11/2019 | Hou et al. |
| 10,511,272 | B2 | 12/2019 | Lyalin |
| 10,522,617 | B2 | 12/2019 | Mcpartlin et al. |
| 10,554,177 | B2 | 2/2020 | Lyalin et al. |
| 10,554,294 | B2 | 2/2020 | Ripley |
| 10,574,191 | B2 | 2/2020 | Zhu et al. |
| 10,587,231 | B2 | 3/2020 | Shi et al. |
| 10,601,655 | B2 | 3/2020 | Hou et al. |
| 10,615,758 | B2 | 4/2020 | Arkiszewski et al. |
| 10,616,053 | B2 | 4/2020 | Hou et al. |
| 10,658,991 | B2 | 5/2020 | Lyalin et al. |
| 10,693,422 | B2 | 6/2020 | Pan et al. |
| 10,749,512 | B2 | 8/2020 | Balteanu et al. |
| 10,778,152 | B2 | 9/2020 | Lyalin et al. |
| 10,886,953 | B2 | 1/2021 | Feng et al. |
| 10,892,715 | B2 | 1/2021 | Pan et al. |
| 10,944,367 | B2 | 3/2021 | Lyalin et al. |
| 11,031,915 | B2 | 6/2021 | Lyalin |
| 11,070,171 | B2 | 7/2021 | Datta et al. |
| 11,070,174 | B2 | 7/2021 | Lyalin et al. |
| 11,088,909 | B2 | 8/2021 | Hou et al. |
| 11,101,775 | B2 | 8/2021 | Datta et al. |
| 11,190,182 | B2 | 11/2021 | Balteanu et al. |
| 11,431,327 | B2 | 8/2022 | Balteanu et al. |
| 11,482,975 | B2 | 10/2022 | Lyalin et al. |
| 11,502,646 | B2 | 11/2022 | Lyalin et al. |
| 11,552,598 | B2 | 1/2023 | Pan et al. |
| 11,601,144 | B2 | 3/2023 | Loh et al. |
| 11,646,782 | B2 | 5/2023 | Wloczysiak |
| 11,671,122 | B2 | 6/2023 | Loh et al. |
| 11,677,368 | B2 | 6/2023 | Lyalin et al. |
| 11,689,202 | B2 | 6/2023 | Balteanu et al. |
| 11,750,151 | B2 | 9/2023 | Datta et al. |
| 11,764,734 | B2 | 9/2023 | Datta et al. |
| 11,855,595 | B2 | 12/2023 | Lyalin et al. |
| 11,855,663 | B2 | 12/2023 | Loh et al. |
| 11,870,643 | B2 | 1/2024 | Hou et al. |
| 12,028,072 | B2 | 7/2024 | Balteanu et al. |
| 12,088,330 | B2 | 9/2024 | Loh et al. |
| 12,278,602 | B2 * | 4/2025 | Goto ..................... H03F 1/0211 |
| 2013/0147427 | A1 | 6/2013 | Polu et al. |
| 2014/0001567 | A1 | 1/2014 | Mcpartlin |
| 2014/0001602 | A1 | 1/2014 | Mcpartlin |
| 2014/0001608 | A1 | 1/2014 | Mcpartlin |
| 2014/0320252 | A1 | 10/2014 | Sun et al. |
| 2016/0261234 | A1 | 9/2016 | Ro et al. |
| 2017/0005624 | A1 | 1/2017 | Zhu et al. |
| 2017/0005626 | A1 | 1/2017 | Zhu et al. |
| 2018/0323758 | A1 | 11/2018 | Lyalin et al. |
| 2019/0079549 | A1 | 3/2019 | Lam et al. |
| 2019/0131438 | A1 | 5/2019 | Mcpartlin |
| 2019/0245508 | A1 | 8/2019 | Lyalin et al. |
| 2019/0363684 | A1 | 11/2019 | Sharma et al. |
| 2020/0036335 | A1 | 1/2020 | Whittaker |
| 2020/0099340 | A1 | 3/2020 | Sharma et al. |
| 2020/0127614 | A1 | 4/2020 | Quaglietta et al. |
| 2020/0220756 | A1 | 7/2020 | Pan et al. |
| 2021/0036664 | A1 | 2/2021 | Mao et al. |
| 2021/0211145 | A1 | 7/2021 | Loh et al. |
| 2022/0021354 | A1 | 1/2022 | Jiang et al. |
| 2022/0045647 | A1 | 2/2022 | Chien et al. |
| 2022/0231640 | A1 | 7/2022 | Lyalin |
| 2022/0376662 | A1 | 11/2022 | Datta et al. |
| 2022/0376733 | A1 | 11/2022 | Datta et al. |
| 2022/0416739 | A1 * | 12/2022 | Wen ........ H03F 3/265 |
| 2023/0006616 | A1 | 1/2023 | Datta et al. |
| 2023/0006617 | A1 | 1/2023 | Datta et al. |
| 2023/0006622 | A1 | 1/2023 | Datta et al. |
| 2023/0024830 | A1 | 1/2023 | Datta et al. |
| 2023/0063006 | A1 | 3/2023 | Khesbak et al. |
| 2023/0065303 | A1 | 3/2023 | Khesbak et al. |

(56) References Cited

U.S. PATENT DOCUMENTS

| | | |
|---|---|---|
| 2023/0065932 A1 | 3/2023 | Khesbak et al. |
| 2023/0104305 A1 | 4/2023 | Lyalin et al. |
| 2023/0113416 A1 | 4/2023 | Datta et al. |
| 2023/0114571 A1 | 4/2023 | Datta et al. |
| 2023/0117991 A1 | 4/2023 | Chyurlia et al. |
| 2023/0246606 A1* | 8/2023 | Xie ................ H03F 3/195 330/252 |
| 2023/0291359 A1 | 9/2023 | Ji et al. |
| 2023/0291370 A1 | 9/2023 | Lyalin et al. |
| 2023/0299729 A1 | 9/2023 | Chen et al. |
| 2023/0327615 A1 | 10/2023 | Chen et al. |
| 2023/0344452 A1 | 10/2023 | Loh et al. |
| 2023/0361724 A1 | 11/2023 | Chen et al. |
| 2023/0361850 A1 | 11/2023 | Wloczysiak |
| 2023/0378917 A1 | 11/2023 | Kundur et al. |
| 2023/0402988 A1 | 12/2023 | Datta et al. |
| 2024/0048101 A1 | 2/2024 | Datta et al. |
| 2024/0079998 A1 | 3/2024 | Drogi et al. |
| 2024/0080005 A1 | 3/2024 | Drogi et al. |
| 2024/0088849 A1 | 3/2024 | Lyalin et al. |

OTHER PUBLICATIONS

Lin, Y.S., Chang, J.F. and Lu, S.S., 2011. Analysis and design of CMOS distributed amplifier using inductively peaking cascaded gain cell for UWB systems. IEEE Transactions on Microwave Theory and Techniques, 59(10), pp. 2513-2524.

* cited by examiner

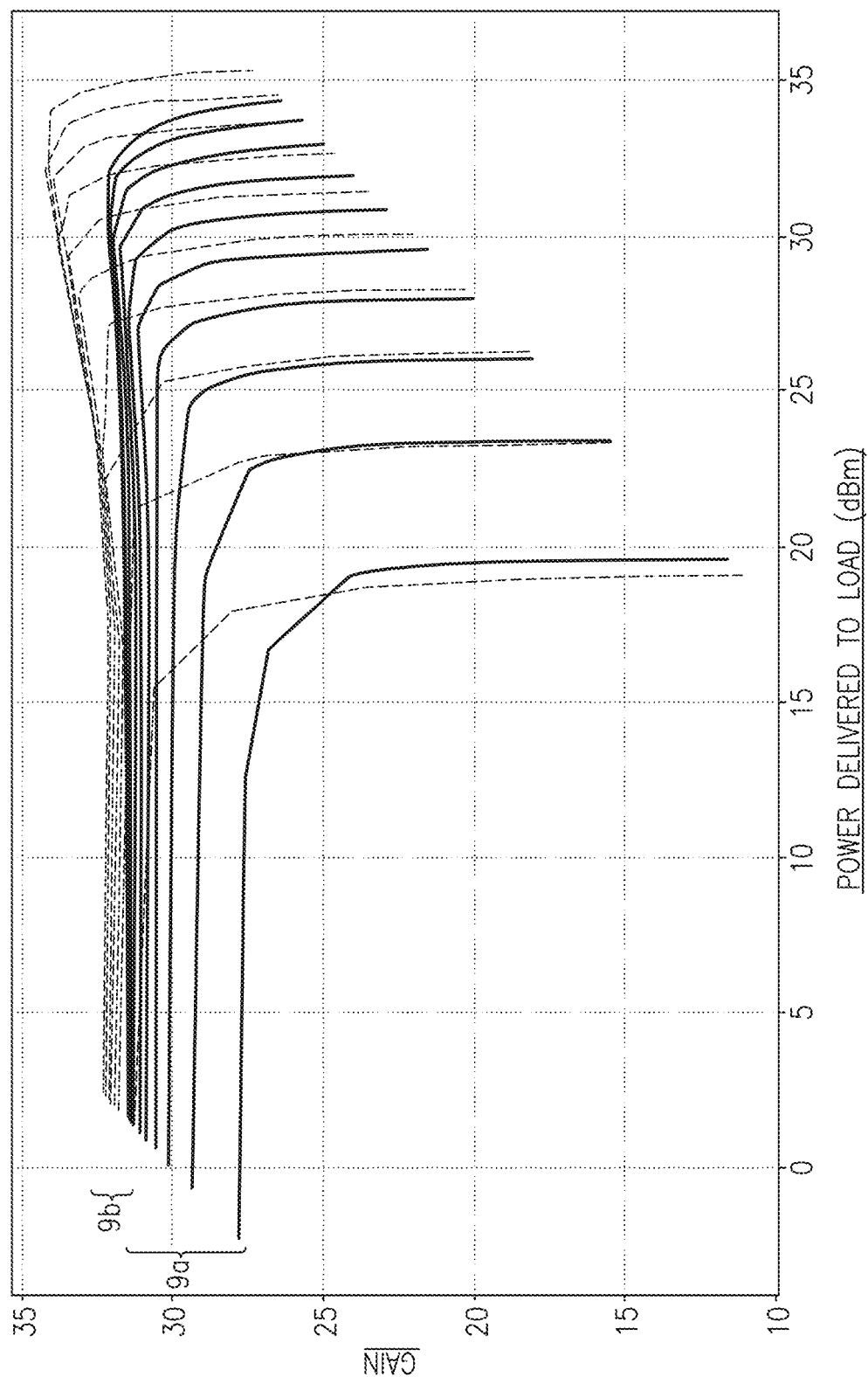

POWER AMPLIFIER SYSTEM WITH REDUCED GAIN VARIATION FOR ENVELOPE TRACKING APPLICATIONS

INCORPORATION BY REFERENCE TO ANY PRIORITY APPLICATIONS

This application is based upon and claims the benefit of priority from U.S. Provisional Patent Application No. 63/251,969 filed on Oct. 4, 2021. Any and all applications for which a foreign or domestic priority claim is identified in the Application Data Sheet as filed with the present application are hereby incorporated by reference under 37 CFR 1.57. The entire contents of each of the above-listed items is hereby incorporated into this document by reference and made a part of this specification for all purposes, for all that each contains.

BACKGROUND

Field

Embodiments of the invention relate to electronic systems, and in particular, to power amplifiers for use in radio frequency (RF) electronics.

Description of Related Technology

Power amplifiers are used in radio frequency (RF) communication systems to amplify RF signals for transmission via antennas. It is important to manage the power of RF signal transmissions to prolong battery life and/or provide a suitable transmit power level.

Examples of RF communication systems with one or more power amplifiers include, but are not limited to, mobile phones, tablets, base stations, network access points, customer-premises equipment (CPE), laptops, and wearable electronics. For example, in wireless devices that communicate using a cellular standard, a wireless local area network (WLAN) standard, and/or any other suitable communication standard, a power amplifier can be used for RF signal amplification. An RF signal can have a frequency in the range of about 30 kHz to 300 GHz, such as in the range of about 410 MHz to about 7.125 GHz for certain communications standards.

SUMMARY

According to some embodiments, there is provided a power amplifier system for amplifying a radio frequency signal. The system can include: a driver transistor coupled to a radio frequency signal input; a transformer balun having a main primary coil connected between the driver transistor and a voltage supply node of the power amplifier system, a secondary coil magnetically coupled to the main primary coil, and an additional primary coil configured to generate a feedback signal related to a signal induced in the main primary coil; and/or a neutralization diode configured to use the feedback signal to reduce a gain variation resulting from variations in a voltage supplied from the voltage supply node of the power amplifier system, the neutralization diode connected between the additional primary coil and the driver transistor.

In some embodiments, the supplied voltage supplied through the voltage supply node changes in relation to an envelope of the radio frequency signal. The feedback signal generated in the additional primary coil can be a voltage that is equal in magnitude and opposite in phase to a voltage of the main primary coil. The neutralization diode can be configured to neutralize an inter-electrode capacitance generated in the driving transistor based on the feedback signal. The driver transistor can be a bipolar-junction transistor having an emitter connected to a ground voltage, a collector connected to a first end of the main primary coil, and a base connected to the input of the radio frequency signal. The additional primary coil can be connected to a second end of the main primary coil. The additional primary coil and the main primary coil can have the same number of windings. The neutralization diode can have a cathode connected to one end of the additional primary coil and an anode connected to a base of the driver transistor. The secondary coil can include a tap node at an intermediate point in the secondary coil provided with a DC bias voltage. The system can further comprise a push-pull amplifier having a first transistor having a base connected to a first end of the secondary coil and a second transistor having a base connected to a second end of the secondary coil. The push-pull amplifier can include a first cross-coupling diode having one end connected to the base of the first transistor and the other end connected to a collector of the second transistor and a second cross-coupling diode having one end connected to the base of the second transistor and the other end connected to a collector of the first transistor. The system can further comprise a second transformer balun having a tertiary coil coupled to the push-pull amplifier and a quaternary coil coupled to an output node of the power amplifier system. The tertiary coil can have a tap at a center of the tertiary coil that is connected to the voltage supply node.

In some embodiments, a radio frequency module can have: a packaging substrate configured to receive a plurality of components, a power amplifier system implemented on the packaging substrate, the power amplifier system including a driver transistor coupled to an input of the radio frequency signal; a transformer balun having a main primary coil connected between the driver transistor and a voltage supply node of the power amplifier system, a secondary coil magnetically coupled to the main primary coil, and an additional primary coil configured to generate a feedback signal related to a signal induced in the main primary coil; and a neutralization diode configured to, based on the feedback signal, reduce a gain variation of the power amplifier system that depends on a supplied voltage, the neutralization diode connected between the additional primary coil and the driver transistor.

In some embodiments, the radio frequency module is a front-end module. In some embodiments, the supplied voltage supplied through the voltage supply node changes in relation to an envelope of the radio frequency signal. In some embodiments, the additional primary coil is configured to generate a feedback signal in the form of a voltage that is equal in magnitude and opposite in phase to a voltage of the main primary coil. In some embodiments, the neutralization diode is configured to use the feedback signal to neutralize an inter-electrode capacitance generated in the driving transistor. In some embodiments, the driver transistor is a bipolar-junction transistor having an emitter connected to a ground voltage, a collector connected to a first end of the main primary coil, and a base connected to the input of the radio frequency signal. In some embodiments, the additional primary coil is connected to a second end of the main primary coil. In some embodiments, the additional primary coil and the main primary coil have an identical number of windings. In some embodiments, the neutralization diode has a cathode connected to one end of the additional primary coil and an anode connected to a base of the driver transistor. In some embodiments, the secondary coil includes a tap node at a center of the secondary coil that provides a DC bias voltage. In some embodiments, the power amplifier system further includes a push-pull amplifier having a first transistor having a base connected to a first end of the secondary coil and a second transistor having a base connected to a second end of the secondary coil. In some embodiments, the push-pull amplifier includes a first cross-coupling diode having one end connected to the base of the first transistor and the other end connected to a collector of the second transistor; and a second cross-coupling diode having one end connected to the base of the second transistor and the other end connected to a collector of the first transistor. In some embodiments, the amplifier system further includes a second transformer balun having a tertiary coil coupled to the push-pull amplifier and a quaternary coil coupled to an output node of the power amplifier system. In some embodiments, the tertiary coil has a tap at an intermediate position in the tertiary coil, the tap connected to the voltage supply node. Some embodiments can be a mobile device having: a transceiver configured to generate a radio frequency signal; a power management system including an envelope tracker configured to generate a power amplifier supply voltage that changes is relation to an envelope of the radio frequency signal; and a front end system comprising the radio frequency module described above.

Some embodiments provide a mobile device including: a transceiver configured to generate a radio frequency signal; a power management system including an envelope tracker configured to generate a power amplifier supply voltage that changes is relation to an envelope of the radio frequency signal; and a front end module. The front end module can include a power amplifier system including a driver transistor coupled to an input of the radio frequency signal. The front end module can include a transformer balun having a main primary coil connected between the driver transistor and a voltage supply node of the power amplifier system, a secondary coil magnetically coupled to the main primary coil, and an additional primary coil configured to generate a feedback signal related to a signal induced in the main primary coil. The front end module can further include a neutralization diode configured to reduce a gain variation of the power amplifier system depending on a supplied voltage, based on the feedback signal. The neutralization diode can be connected between the additional primary coil and the driver transistor.

Additional Embodiments

Some embodiments provide for a mobile device having: a transceiver configured to generate a radio frequency signal; a power management system including an envelope tracker configured to generate a power amplifier supply voltage that changes is relation to an envelope of the radio frequency signal; and a front end system including a power amplifier system having a driver transistor coupled to a radio frequency signal input, a transformer balun having a main primary coil connected between the driver transistor and a voltage supply node of the power amplifier system, a secondary coil magnetically coupled to the main primary coil and an additional primary coil configured to generate a feedback signal related to a signal of the main primary coil, and a push-pull amplifier having a first transistor having a base connected to a first end of the secondary coil and a second transistor having a base connected to a second end of the secondary coil.

The push-pull amplifier can include: a first cross-coupling diode having one end connected to the base of the first transistor and the other end connected to a collector of the second transistor; and a second cross-coupling diode having one end connected to the base of the second transistor and the other end connected to a collector of the first transistor. The mobile device can further comprise a neutralization diode connected between the additional primary coil and the drive transistor and configured to, based on the feedback signal, reduce a gain variation resulting from variations in voltage supplied to the power amplifier system. The supplied voltage supplied through the voltage supply node can be configured to change in relation to an envelope of the radio frequency signal. The additional primary coil can have the same number of windings as the main primary coil and thereby be configured to generate, as a feedback signal, a voltage that is equal in magnitude and opposite in phase to a voltage of the main primary coil. The neutralization diode can be configured to use the feedback signal to neutralize an inter-electrode capacitance generated in the driving transistor. The driver transistor can be a bipolar-junction transistor (BJT) having an emitter connected to a ground voltage, a collector connected to a first end of the main primary coil, and a base connected to the input of the radio frequency signal. The additional primary coil can be connected to a second end of the main primary coil. The additional primary coil can have an identical number of windings to the main primary coil. The neutralization diode can have a cathode connected to one end of the additional primary coil and an anode connected to a base of the driver transistor. The secondary coil can include a tap node at a center of the secondary coil and is provided with a DC bias voltage. The mobile device's power amplifier system can further include a second transformer balun having a tertiary coil coupled to the push-pull amplifier and a quaternary coil coupled to an output node of the power amplifier system. The tertiary coil can have a tap at a center of the tertiary coil that is connected to the voltage supply node.

Some embodiments provide a radio frequency module, which can have: a packaging substrate configured to receive a plurality of components; and a power amplifier system implemented on the packaging substrate, the power amplifier system including a driver transistor coupled to an input of the radio frequency signal, a transformer balun having an input coil and an output coil, and push-pull stage neutralization deploying two transistors cross-connected to opposite ends of the output coil in the transformer balun.

In some embodiments, the push-pull stage neutralization uses a push-pull amplifier, the two transistors include a first transistor having a base connected to a first end of the output coil and a second transistor having a base connected to a second end of the output coil, and the push-pull amplifier further includes a first cross-coupling diode having one end connected to the base of the first transistor and the other end connected to a collector of the second transistor, and a second cross-coupling diode having one end connected to the base of the second transistor and the other end connected to a collector of the first transistor. In some embodiments, the input and output coils are mutually intertwined, and both have a generally octagonal shape. In some embodiments, the input coil of the transformer balun includes a main primary coil connected between the driver transistor and a voltage supply node of the power amplifier system, the output coil is a secondary coil magnetically coupled to the main primary coil, and the radio frequency module further comprises an additional primary coil configured to generate a feedback signal related to a signal in the main primary coil. In some embodiments, the additional primary coil has the same number of windings and same direction of windings as the main primary coil. In some embodiments, the additional primary coil is formed from a thin metal auxiliary layer of heterojunction bipolar transistor process that is typically not used in routing. In some embodiments, the radio frequency module further includes a neutralization diode configured to, based on the feedback signal, reduce a gain variation of the power amplifier system that results from variations in a supplied voltage, the neutralization diode connected between the additional primary coil and the driver transistor. In some embodiments, a mobile device can have multiple cells implementing the features of the radio frequency module; each cell can have its own first and second cross-coupling diodes, thereby allowing the power amplifier system to operate in a stable manner.

In some embodiments, there is provided a multi-cell mobile device with a radio frequency module. The module can include a power amplifier system with a driver transistor coupled to an input of the radio frequency signal, a transformer balun having an input coil and an output coil. The module can further include a push-pull neutralization stage including a push-pull amplifier, a first transistor having a base connected to a first end of the output coil, a second transistor having a base connected to a second end of the output coil, and cross-coupling diodes connected therebetween, each cell having its own first and second cross-coupling diodes, thereby allowing the power amplifier system to operate in a stable manner.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

FIG. 9 shows data for gain variation versus amount of power delivery by a power amplifier system according to the present disclosure.

DETAILED DESCRIPTION

Figure 1:
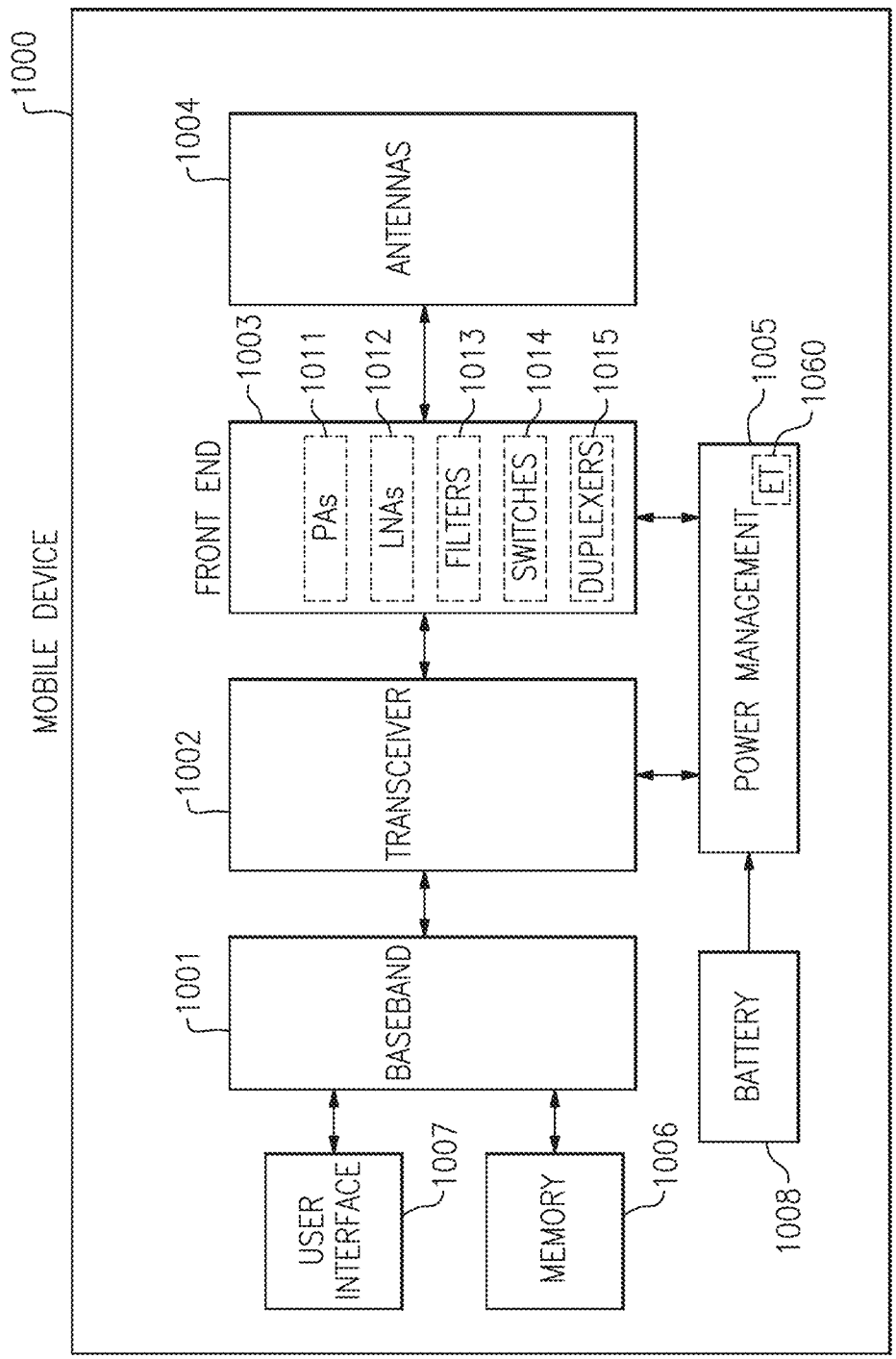
FIG. 1 is a schematic diagram of one embodiment of a mobile device.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

FIG. 1 is a schematic diagram of one example of a mobile device 1000. The mobile device 1000 includes a baseband system 1001, a transceiver 1002, a front end system 1003, antennas 1004, a power management system 1005, a memory 1006, a user interface 1007, and a battery 1008.

The mobile device 1000 can be used communicate using a wide variety of communications technologies, including, but not limited to, 2G, 3G, 4G (including LTE, LTE-Advanced, and LTE-Advanced Pro), 5G, WLAN (for instance, Wi-Fi), WPAN (for instance, Bluetooth and Zig-Bee), WMAN (for instance, WiMax), and/or GPS technologies.

The transceiver 1002 generates RF signals for transmission and processes incoming RF signals received from the antennas 1004. It will be understood that various functionalities associated with the transmission and receiving of RF signals can be achieved by one or more components that are collectively represented in FIG. 1 as the transceiver 1002. In one example, separate components (for instance, separate circuits or dies) can be provided for handling certain types of RF signals.

The front end system 1003 aids is conditioning signals transmitted to and/or received from the antennas 1004. In the illustrated embodiment, the front end system 1003 includes power amplifiers (PAs) 1011, low noise amplifiers (LNAs) 1012, filters 1013, switches 1014, and duplexers 1015. However, other implementations are possible.

For example, the front end system 1003 can provide a number of functionalities, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), or some combination thereof.

In certain implementations, the mobile device 1000 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band and/or in different bands.

The antennas 1004 can include antennas used for a wide variety of types of communications. For example, the antennas 1004 can include antennas associated transmitting and/or receiving signals associated with a wide variety of frequencies and communications standards.

In certain implementations, the antennas 1004 support MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

The mobile device 1000 can operate with beamforming in certain implementations. For example, the front end system 1003 can include phase shifters having variable phase controlled by the transceiver 1002. Additionally, the phase shifters are controlled to provide beam formation and directivity for transmission and/or reception of signals using the antennas 1004. For example, in the context of signal transmission, the phases of the transmit signals provided to the antennas 1004 are controlled such that radiated signals from the antennas 1004 combine using constructive and destructive interference to generate an aggregate transmit signal exhibiting beam-like qualities with more signal strength propagating in a given direction. In the context of signal reception, the phases are controlled such that more signal energy is received when the signal is arriving to the antennas 1004 from a particular direction. In certain implementations, the antennas 1004 include one or more arrays of antenna elements to enhance beamforming.

The baseband system 1001 is coupled to the user interface 1007 to facilitate processing of various user input and output (I/O), such as voice and data. The baseband system 1001 provides the transceiver 1002 with digital representations of transmit signals, which the transceiver 1002 processes to generate RF signals for transmission. The baseband system 1001 also processes digital representations of received signals provided by the transceiver 1002. As shown in FIG. 1, the baseband system 1001 is coupled to the memory 1006 of facilitate operation of the mobile device 1000.

The memory 1006 can be used for a wide variety of purposes, such as storing data and/or instructions to facilitate the operation of the mobile device 1000 and/or to provide storage of user information.

The power management system 1005 provides a number of power management functions of the mobile device 1000. The power management system 1005 of FIG. 1 includes an envelope tracker 1060. As shown in FIG. 1, the power management system 1005 receives a battery voltage form the battery 1008. The battery 1008 can be any suitable battery for use in the mobile device 1000, including, for example, a lithium-ion battery.

The mobile device 1000 of FIG. 1 illustrates one example of an RF communication system that can include power amplifier(s) implemented in accordance with one or more features of the present disclosure. However, the teachings herein are applicable to RF communication systems implemented in a wide variety of ways.

Figure 2:
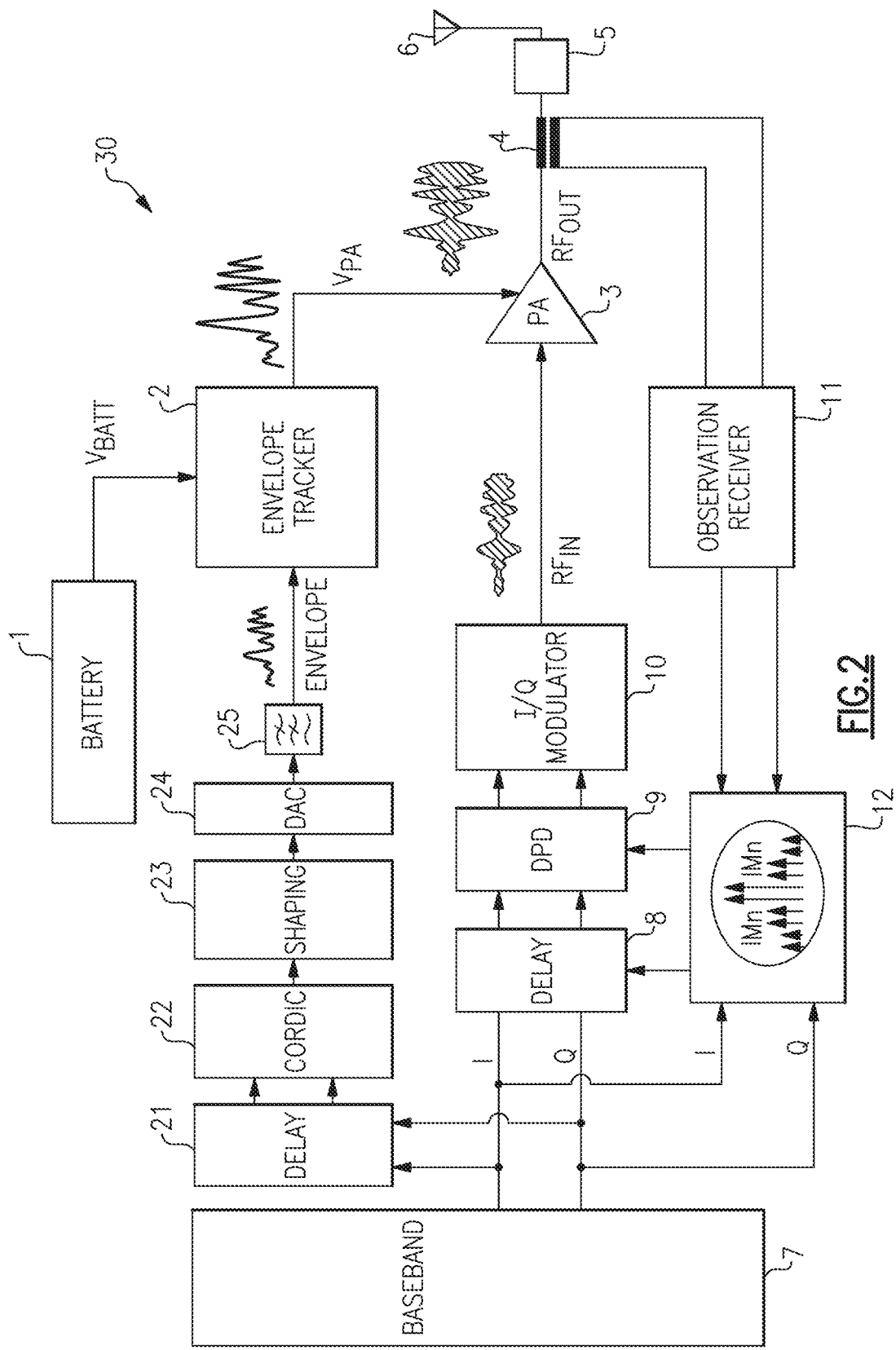
FIG. 2 is a schematic diagram of one embodiment of a transmit system for transmitting radio frequency (RF) signals from a mobile device.

FIG. 2 is a schematic diagram of one embodiment of a transmit system for transmitting RF signals from a mobile device. The transmit system 30 includes a battery 1, an envelope tracker 2, a power amplifier 3, a directional coupler 4, a duplexing and switching circuit 5, an antenna 6, a baseband processor 7, a signal delay circuit 8, a digital pre-distortion (DPD) circuit 9, an I/Q modulator 10, an observation receiver 11, an intermodulation detection circuit 12, an envelope delay circuit 21, a coordinate rotation digital computation (CORDIC) circuit 22, a shaping circuit 23, a digital-to-analog converter 24, and a reconstruction filter 25.

The transmit system 30 of FIG. 2 illustrates one example of an RF communication system that can include power amplifier(s) implemented in accordance with one or more features of the present disclosure. However, the teachings herein are applicable to RF communication systems implemented in a wide variety of ways.

The baseband processor 7 operates to generate an I signal and a Q signal, which correspond to signal components of a sinusoidal wave or signal of a desired amplitude, frequency, and phase. For example, the I signal can be used to represent an in-phase component of the sinusoidal wave and the Q signal can be used to represent a quadrature-phase component of the sinusoidal wave, which can be an equivalent representation of the sinusoidal wave. In certain implementations, the I and Q signals are provided to the I/Q modulator 10 in a digital format. The baseband processor 7 can be any suitable processor configured to process a baseband signal. For instance, the baseband processor 7 can include a digital signal processor, a microprocessor, a programmable core, or any combination thereof.

The signal delay circuit 8 provides adjustable delay to the I and Q signals to aid in controlling relative alignment between the envelope signal and the RF signal $RF_{IN}$. The amount of delay provided by the signal delay circuit 8 is controlled based on amount of intermodulation detected by the intermodulation detection circuit 12.

The DPD circuit 9 (digital pre-distortion circuit) operates to provide digital shaping to the delayed I and Q signals from the signal delay circuit 8 to generate digitally pre-distorted I and Q signals. In the illustrated embodiment, the DPD provided by the DPD circuit 9 is controlled based on amount of intermodulation detected by the intermodulation detection circuit 12. The DPD circuit 9 serves to reduce a distortion of the power amplifier 3 and/or to increase the efficiency of the power amplifier 3.

The I/Q modulator 10 receives the digitally pre-distorted I and Q signals, which are processed to generate an RF signal $RF_{IN}$. For example, the I/Q modulator 10 can include DACs configured to convert the digitally pre-distorted I and Q signals into an analog format, mixers for upconverting the analog I and Q signals to radio frequency, and a signal combiner for combining the upconverted I and Q signals into an RF signal suitable for amplification by the power amplifier 3. In certain implementations, the I/Q modulator 10 can include one or more filters configured to filter frequency content of signals processed therein.

The envelope delay circuit 21 delays the I and Q signals from the baseband processor 7. Additionally, the CORDIC circuit 22 processes the delayed I and Q signals to generate a digital envelope signal representing an envelope of the RF signal $RF_{IN}$. Although FIG. 2 illustrates an implementation using the CORDIC circuit 22, an envelope signal can be obtained in other ways.

The shaping circuit 23 operates to shape the digital envelope signal to enhance the performance of the transmit system 30. In certain implementations, the shaping circuit 23 includes a shaping table that maps each level of the digital envelope signal to a corresponding shaped envelope signal level. Envelope shaping can aid in controlling linearity, distortion, and/or efficiency of the power amplifier 3.

In the illustrated embodiment, the shaped envelope signal is a digital signal that is converted by the DAC 24 to an analog envelope signal. Additionally, the analog envelope signal is filtered by the reconstruction filter 25 to generate an envelope signal suitable for use by the envelope tracker 2. In certain implementations, the reconstruction filter 25 includes a low pass filter.

With continuing reference to FIG. 2, the envelope tracker 2 receives the envelope signal from the reconstruction filter 25 and a battery voltage $V_{BATT}$ from the battery 1, and uses the envelope signal to generate a power amplifier supply voltage $V_{PA}$ for the power amplifier 3 that changes in relation to the envelope of the RF signal $RF_{IN}$. The power amplifier 3 receives the RF signal $RF_{IN}$ from the I/Q modulator 10, and provides an amplified RF signal $RF_{OUT}$ to the antenna 6 through the duplexing and switching circuit 5, in this example.

The directional coupler 4 is positioned between the output of the power amplifier 3 and the input of the duplexing and switching circuit 5, thereby allowing a measurement of output power of the power amplifier 3 that does not include insertion loss of the duplexing and switching circuit 5. The sensed output signal from the directional coupler 4 is provided to the observation receiver 11, which can include mixers for down converting I and Q signal components of the sensed output signal, and DACs for generating I and Q observation signals from the downconverted signals.

The intermodulation detection circuit 12 determines an intermodulation product between the I and Q observation signals and the I and Q signals from the baseband processor 7. Additionally, the intermodulation detection circuit 12 controls the DPD provided by the DPD circuit 9 and/or a delay of the signal delay circuit 8 to control relative alignment between the envelope signal and the RF signal $RF_{IN}$.

By including a feedback path from the output of the power amplifier 3 and baseband, the I and Q signals can be dynamically adjusted to optimize the operation of the transmit system 30. For example, configuring the transmit system 30 in this manner can aid in providing power control, compensating for transmitter impairments, and/or in performing DPD (digital pre-distortion).

Although illustrated as a single stage, the power amplifier 3 can include one or more stages. Furthermore, RF communication systems such as mobile devices can include multiple power amplifiers. In such implementations, separate envelope trackers can be provided for different power amplifiers and/or one or more shared envelope trackers can be used.

Envelope tracking is a technique that can be used to increase power added efficiency (PAE) of a power amplifier by efficiently controlling a voltage level of a power amplifier supply voltage in relation to an envelope of the RF signal amplified by the power amplifier. Thus, when the envelope of the RF signal increases, the voltage supplied to the power amplifier can be increased. Likewise, when the envelope of the RF signal decreases, the voltage supplied to the power amplifier can be decreased to reduce power consumption.

Figure 3:
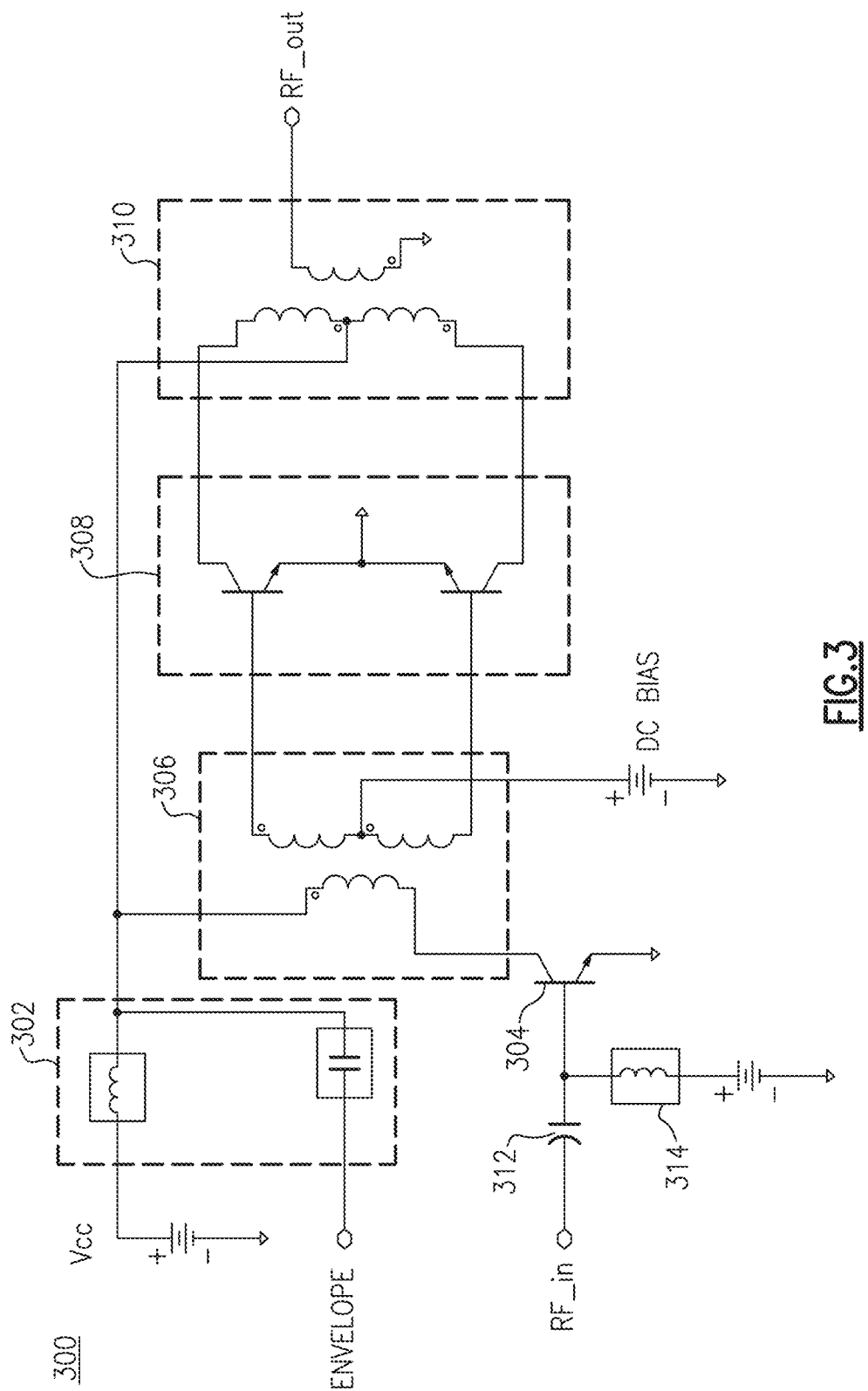
FIG. 3 is schematic diagram of one example of a power amplifier system for transmitting a radio frequency signal.

FIG. 3 is schematic diagram of one example of a power amplifier system 300 for transmitting a radio frequency signal. As shown in FIG. 3, the power amplifier system 300 is coupled to an envelope tracker 302. The envelope tracker 302 is configured to generate a power amplifier supply voltage that changes in relation to an envelope of the radio frequency signal. The power amplifier system 300 is configured to amplify the radio frequency signal and to receive power from the power amplifier supply voltage.

The power amplifier system 300 includes a driving transistor 304, a first transformer balun 306, a push-pull amplifer 308, and a second transformer balun 310.

A driving transistor 304 is a transistor coupled to an input of the power amplifier system 300. The driving transistor 304 is a bipolar-junction transistor (BJT). The driving transistor 304 has a base electrically coupled to an input of the power amplifier system 300 via an input capacitor 312. The base of the driving transistor 304 is also connected to one end of an inductor 314 having the other end biased by a DC voltage supply. The driving transistor 304 has an emitter connected to a ground (=0 [V]). Thus, the driving transistor 304 may be referred to as a single-ended driver.

In general, a transformer balun (see 306, 310) is an electrical device that converts between a balanced signal and an unbalanced signal. In this example, the first transformer balun 306 converts an unbalanced signal to a balanced signal, and the second transformer balun 310 converts a balanced signal to an unbalanced signal.

The first transformer balun 306 is coupled to the driving transistor 304. Since the driving transistor 304 has a grounded emitter, the signal induced by the driving transistor 304 is an unbalanced signal. The first transformer balun 306 includes a primary coil and a secondary coil. The primary coil of the first transformer balun 306 is connected between a collector of the driving transistor 304 and a voltage supply node. The voltage supply node is connected to the envelope tracker 302. The secondary coil of the first transformer balun includes a tap at a center of the secondary coil. The tap of the secondary coil is biased by a DC voltage supply.

The push-pull amplifier 308 includes two transistors connected in parallel with each other and symmetrically with respect to the tap of the secondary coil. A push-pull amplifier is a type of electronic circuit that uses a pair of active devices that alternately supply current to, or absorb current from, a connected load. Each of the transistors included in the push-pull amplifier is a bipolar-junction transistor (BJT), or particularly a heterojunction bipolar transistor (HBT).

The second transformer balun 310 includes a tertiary coil and a quaternary coil. The tertiary coil includes a tap at a center of the tertiary coil that is connected to the voltage supply node. One end of the quaternary coil is connected to a ground and the other end of the quaternary coil is connected to the output node of the power amplifier system 300. Since the one end of the quaternary coil is connected to a ground, the output signal of the power amplifier system 300 is an unbalanced signal.

The voltage supply node is connected to a DC bias node (Vcc) via an inductor 316 and the envelope tracker 302 is connected to the voltage supply node via a capacitor 318.

As shown in FIG. 3, the power amplifier system 300 includes a driving transistor 304, and two transistors in the push-pull amplifier 308. However, as described by the Miller effect, undesired capacitance between electrodes can be present in an active device (such as the base and emitter of a bipolar transistor). The inter-electrode capacitance causes gain variation in the amplifiers depending on the power delivered to the load via the amplifier. The gain variation can be beneficial in terms of improvement of average efficiency of the transmitter, but it can be detrimental to out-of-band emissions when accurate control of compression cannot be achieved. Accordingly, the disclosed inventions improve an adjacent channel leakage ratio (ACLR) and out-of-band noise of an envelope tracking (ET) amplifier and can enable a discrete voltage step envelope tracking multi-level supply (MLS). Particularly, if supply voltage follows the envelope of a radio frequency signal (discrete or continuous), an iso-gain behavior of the power amplifier is desired to eliminate gain-to-supply voltage dependency so as to minimize signal distortion Eliminating or mitigating gain versus Vcc dependence (as disclosed herein) can be valuable for implementing sub-6 GHz 5G amplifiers, for example.

Figure 4:
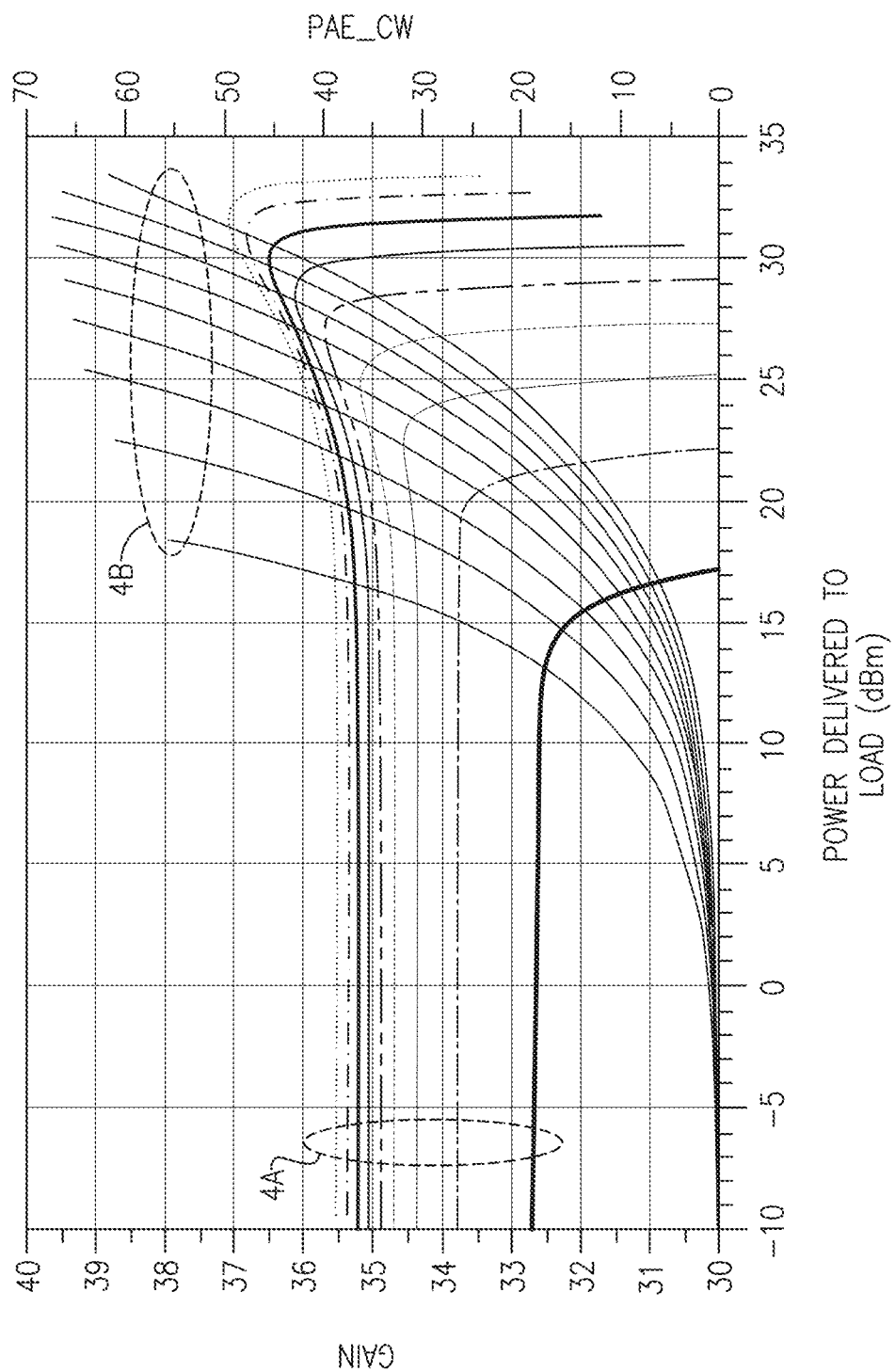
FIG. 4 is an example of gain variation versus amount of power delivery by a power amplifier system such as that of FIG. 3.

FIG. 4 is a graph representing gain variation versus amount of power delivered by a power amplifier system. Lines 4A represent gain and lines 4B represent PAE (power added efficiency). As shown in FIG. 4, due to non-linear collector-base capacitance amplified by the Miller effect in the transistors, the power amplifier exhibits a strong dependence of gain versus supply voltage.

One of the methods for eliminating the inter-electrode capacitance is a neutralization method.

Figure 5:
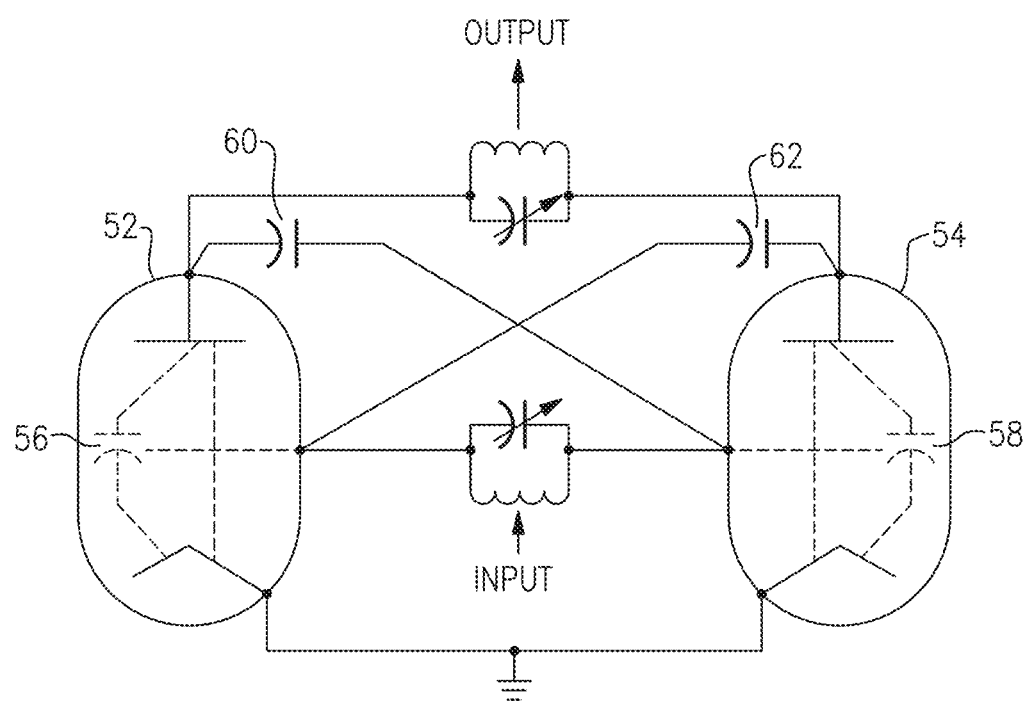
FIG. 5 is an example of neutralization of a symmetrical grid-excited amplifier by cross-connected capacitors.

FIG. 5 is an example of neutralization of a symmetrical grid-excited amplifier by cross-connected capacitors.

In FIG. 5 is shown a symmetrical or push-pull amplifier including active devices 52, 54 with grounded cathode. The active devices can be vacuum tubes or other electrical devices, for example. If the inductance of the leads is considered to be negligible at the operating frequency, independence between the input and output circuits is generally obtained by cross-connecting the grids and anodes through capacitors 60, 62 having values equal to the internal grid-anode capacitance, 56, 58, of the active devices (e.g., vacuum tubes). The requirements of stability and neutralization are fulfilled simultaneously because the input circuit is connected between the grids (in the case of a symmetrical stage) or between the cathode and grid (in a single-ended amplifier).

A power amplifier system with reduced gain variation for the envelope tracking is provided herein.

Figure 6:
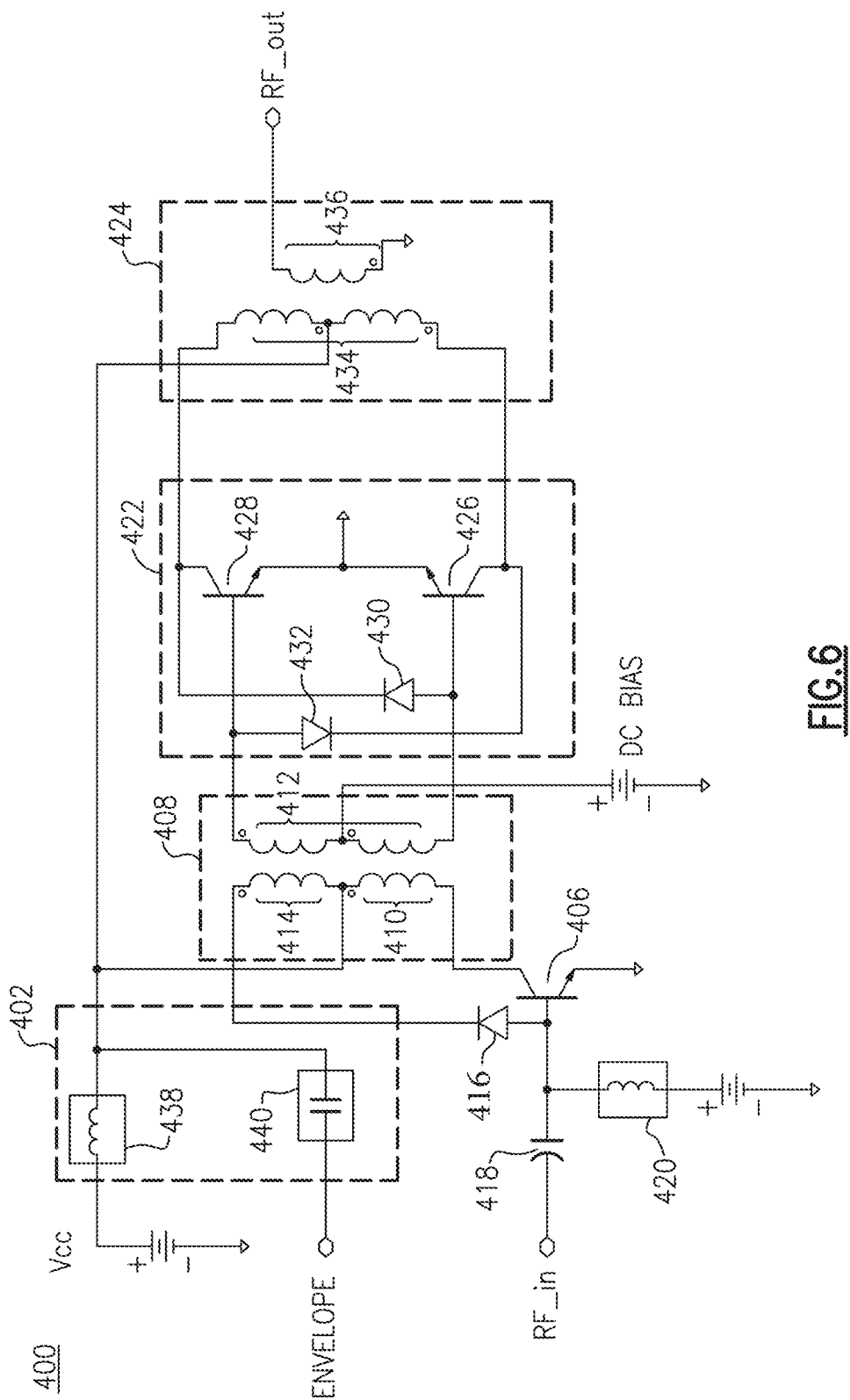
FIG. 6 is a schematic diagram of a power amplifier system.

FIG. 6 is a schematic diagram of power amplifier system 400. As shown in FIG. 6, the power amplifier system 400 is coupled to an envelope tracker 402. The envelope tracker 402 is configured to generate a power amplifier supply voltage. The power amplifier supply voltage changes in relation to an envelope of the radio frequency signal. The envelope tracker 402 is configured to provide the power amplifier supply voltage to the amplifier system 400 via a voltage supply node. The envelope tracker 402 may include an inductor 438 and a capacitor 440. The power amplifier system 400 is configured to amplify the radio frequency signal and to receive power from the power amplifier supply voltage via a voltage supply node of the power amplifier system 400.

The power amplifier system 400 includes a driving transistor 406, a transformer balun 408, and a neutralization diode 416. In certain embodiments, the power amplifier system 400 may further include a push-pull amplifer 422 and a second transformer balun 424. In those embodiments, the transformer balun 408 may be referred to as a first transformer balun 408 in order to provide additional clarity and easier distinction from the second transformer balun 424.

The driving transistor 406 is coupled to an input of the power amplifier system 400. The driving transistor 406 is configured to receive the radio frequency signal. The driving transistor 406 may be a bipolar-junction transistor (BJT) having an emitter connected to a ground voltage, a collector connected to a first end of the main primary coil, and a base connected to the input of the radio frequency signal. The input of the power amplifier system 400 may be connected to the base of the driving transistor 406 through an input capacitor 418. The base of the driving transistor 406 may be connected to one end of an inductor 420 having the other end biased by a DC voltage.

Figure 7:
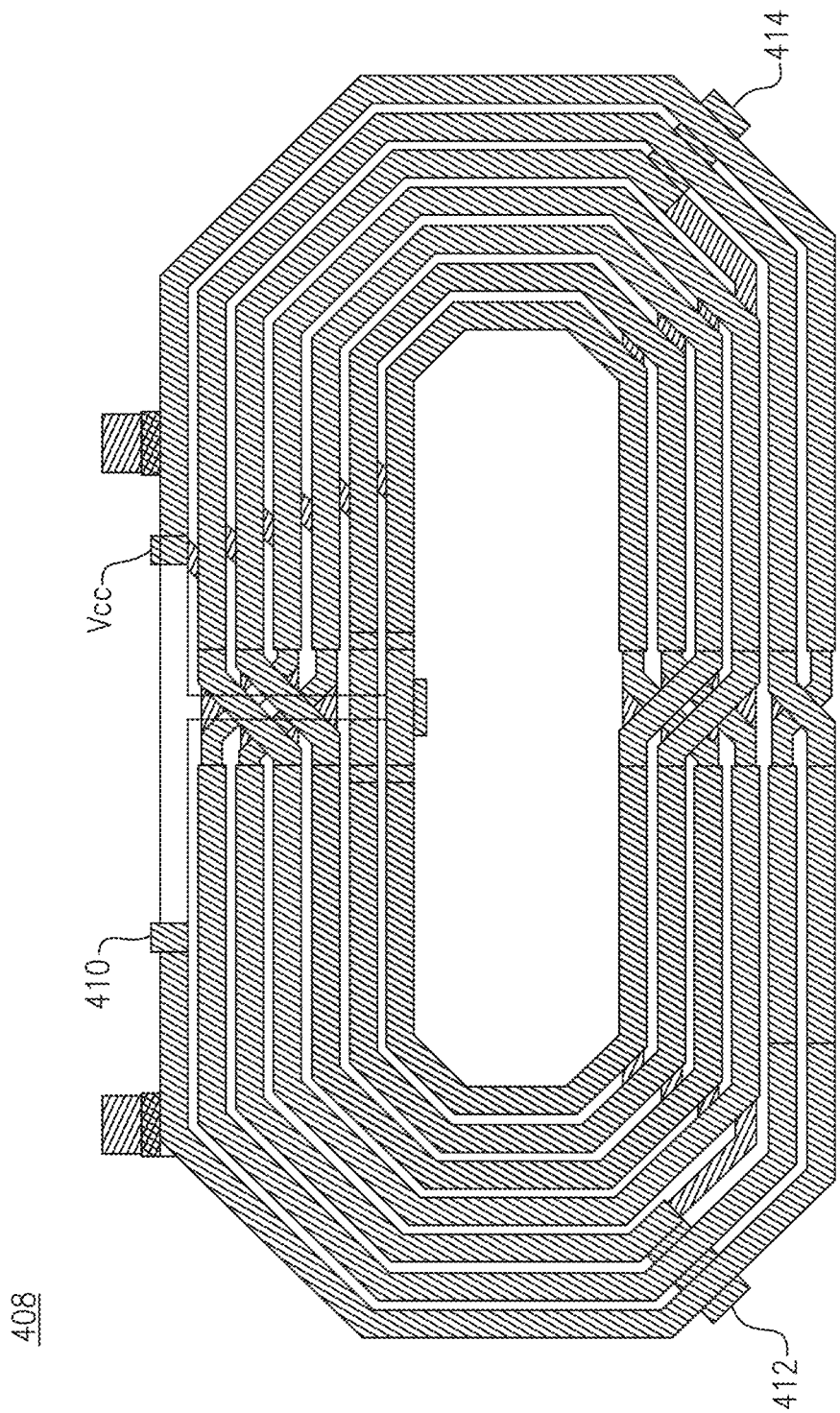
FIG. 7 is an example implementation of a double-tapped transformer balun

The transformer balun (a first transformer balun) 408 is configured to convert from an unbalanced signal to a balanced signal. The transformer balun 408 includes a main primary coil 410 and an additional primary coil 414 on a first stage, and a secondary coil 412 on a second stage. The main primary coil 410 is connected between the driver transistor 406 and a voltage supply node of the power amplifier system 400. The secondary coil 412 is magnetically coupled to the main primary coil 410. The windings of the main primary coil 410 and the secondary coil 412 are wound in a same direction. Thus, the applied voltage and the induced voltage have same direction in both windings of the main primary coil 410 and the secondary coil 412. The additional primary coil 414 is configured to generate a feedback signal related to a signal in the main primary coil 410. Through induction effects and/or interactions between the primary and secondary coils, the feedback signal is a voltage that is equal in magnitude and opposite in phase to a voltage of the main primary coil 410. The feedback signal may be a non-linear signal. The additional primary coil 414 is connected to a second end of the main primary coil 410. The second end of the main primary coil 414 is the other end from the one connected to the driving transistor 406. It can be also understood that the primary coil on the first stage has a tap at a center of the primary coil, and the tap defines a first portion of the primary coil and a second portion of the primary coil. The tap of the primary coil may be connected to the voltage supply node. The additional primary coil 414 has an identical number of windings to the main primary coil 410. The additional primary coil 414 has an identical direction of windings to the main primary coil 410. As AC current in feedback path is relatively low, the additional primary coil 414 can be implemented using a thin metal auxiliary layer of HBT process that is typically not used in routing, as shown in FIG. 7.

The secondary coil 412 may have a tap from an intermediate point (e.g., center point) that connects to a DC bias node supplying a DC bias voltage. In some embodiments, the transformer balun 408 has a form of double-tapped balun that has a tap on both sides of the primary coil and the secondary coil.

The neutralization diode 416 is configured to reduce a gain variation of the power amplifier system 400 depending on a supplied power, based on the feedback signal generated in the additional primary coil 414. The gain variation can also be defined in terms of power delivery of the power amplifier system. The gain variation depending on the supplied power may be caused by an inter-electrode capacitance of the driving transistor 406. The inter-electrode capacitance of the driving transistor 406 may be a capacitance between the base and the collector of the driving transistor 406. The inter-electrode capacitance of the driving transistor 406 may cause an undesired signal in the driving transistor 406. The undesired signal may have a negative voltage value. The undesired signal may be a non-linear signal. The neutralization diode 416 is configured to neutralize the inter-electrode capacitance generated in the driver transistor based on the feedback signal generated by the additional primary coil 414. The neutralization diode 416 is connected between the additional primary coil 414 and the driver transistor 406. More specifically, the neutralization diode 416 is configured to have a cathode connected to one end of the additional primary coil 414 and an anode connected to the base of the driving transistor 406. The neutralization diode 416 may have a similar size to a base-collector junction of the driver transistor 406, such that the neutralization diode 416 and the driver transistor 406 may be positioned in a compact device.

According to some embodiments, the additional primary coil 414 generates a voltage equal in magnitude and opposite in phase to that of the main primary coil 410, and the generated voltage is applied to the neutralization diode 416. The non-linear feedback through the neutralization diode 416 cancels intrinsic collector-base capacitance of the driving transistor 406, and thus improves linearity and eliminates gain dependence on the supply voltage.

According to some embodiments, the power amplifier system 400 may further include a push-pull amplifer 422. The push-pull amplifier 422 may include a first transistor 426 having a base connected to a first end of the secondary coil 412 and a second transistor 428 having a base connected to a second end of the secondary coil 412. The first transistor 426 and the second transistor 428 of the push-pull amplifier 422 operate symmetrically with respect to the secondary coil 412, or a tap of the secondary coil 412. The push-pull amplifer 422 may be implemented in an output stage of the power amplifier system 400.

The push-pull amplifier 422 includes a first cross-coupling diode 430 having one end connected to the base of the first transistor 426 and the other end connected to a collector of the second transistor 428; and a second cross-coupling diode 432 having one end connected to the base of the second transistor 428 and the other end connected to a collector of the first transistor 426.

Figure 8:
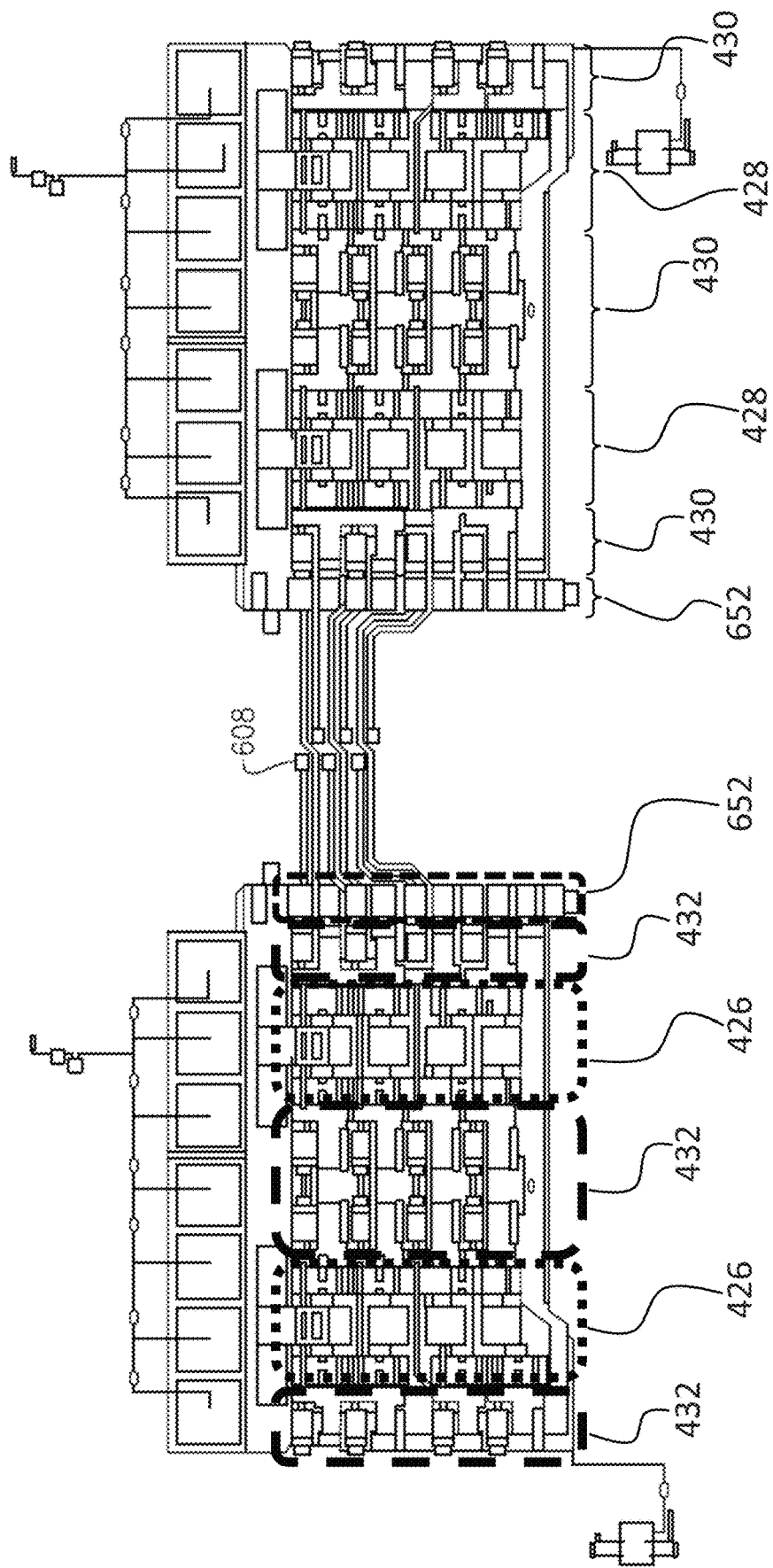
FIG. 8 is an example implementation of an output stage of a power amplifier system.

The first cross-coupling diode 430 and the second cross-coupling diode 432 may be implemented in the output stage of the power amplifier system 400 and may be embedded in a segmented manner. In other words, each of the diodes can be positioned per cell as shown in FIG. 8. This approach (with can include, for example, having constant or appropriate separation distances between the electronic elements and/or cross-coupling within individual cells) can allow the power amplifier system 400 to operate in a stable manner.

According to some embodiments, the first cross-coupling diode 430 and the second cross-coupling diode 432 are configured to neutralize the inter-electrode capacitances generated by the first transistor 426 and the second transistor 428, respectively. In other words, the inter-electrode capacitance generated in the first transistor 426 and the second transistor 428 can be eliminated by the first cross-coupling diode 430 and the second cross-coupling diode 432. By eliminating the effect of inter-electrode capacitances of the first transistor 426 and the second transistor 428, the linearity of the push-pull amplifier 422 can be improved, and the overall gain variation of the power amplifier 400 system depending on the voltage supply can be reduced.

According to some embodiments, the power amplifier system 400 may further include a second transformer balun 424. The second transformer balun 424 is configured to convert from a balanced signal to an unbalanced signal. The second transformer balun 424 may include a tertiary coil 434 coupled to the push-pull amplifier 422. The tertiary coil 434 may have one end connected to a collector of the second transistor 428 of the push-pull amplifier 422 and the other end connected to a collector of the first transistor 426 of the push-pull amplifier 422. The tertiary coil 434 has a tap at a center of the tertiary coil 434 that is connected to the voltage supply node. The second transformer balun 424 may include a quaternary coil 436 magnetically coupled to the tertiary coil 434. The quaternary coil 436 may be coupled to an output node of the power amplifier system 400.

FIG. 7 is an example of implementation of the double-tapped transformer balun (e.g., first transformer balun 408) according to some embodiments.

As shown in FIG. 7, the double-tapped transformer balun 408 may be formed in a generally octagonal shape. As AC current flows through the double-tapped transformer, each coil can have a form of a thin layer. The main primary coil 410, the secondary coil 412, and the additional coil 414 may be partially overlapped with each other. The number of coils included in a single double-tapped transformer balun is not limited to the number shown here. Moreover, a plurality of double-tapped transformer baluns (such as the one shown in FIG. 7, for example) can be implemented in a single device.

FIG. 8 is an example of implementation of output stage of the power amplifier system.

As shown in FIG. 8, the transistors 426, 428 referred to in FIG. 6 can be positioned in each cell, such that a stable operation of power amplifier system can be maintained. Here, the left side of the figure shows cross-coupling diodes 432, interspersed with transistors 426. The right side of the figure shows cross-coupling diodes 430, interspersed with transistors 428. Also visible in this figure are ESD/ruggedness diodes 652. The diodes 430 and 432 are segmented and distributed across the array to enhance or ensure stability of operation. Each individual transistor in the arrays 426 and 428 advantageously receives equal amount of power from the cross-coupled side to avoid the situation where this non-linear feedback via 430 and 432 (positive in nature) may become excessive and lead to instability. Accordingly, this figure shows multiple cross-links between, on the one hand, the side encompassing the transistors 428 and the cross-coupling diodes 430, and on the other hand, the transistors 426 and the cross-coupling diodes 432.

FIG. 9 shows an example of gain variation versus amount of power delivered by a power amplifier system according to some embodiments.

In FIG. 9, solid lines (generally labeled 9*a*) represent a gain variation of an existing power amplifier system, provided here as baseline data. Dashed lines (generally labeled 9*b*) in FIG. 9 represent a gain variation of a power amplifier 400 with neutralization. Here, neutralization was provided using a double-tapped transformer balun (such as the balun 408 of FIG. 6) and a neutralization diode (such as the diode 416 of FIG. 6).

As shown in FIG. 9, lines 9*a* are more spread in the vertical dimension, which means the gain variation depending on supply voltage is high. In envelope tracking, the high gain variation causes difficulties in accurate control of the power amplifier system. In contrast, lines 9*b* are more closely-spaced in the vertical dimension, showing that the gain variation has been significantly reduced. According to measured data, gain variation depending on a voltage supply (Vcc) has been reduced from 3.7 dB to 1.5 dB over a range of Vcc from 1V to 5V. According to measured data, gain variation depending on a voltage supply (Vcc) has been reduced from 3.0 dB to 1.0 dB over a range of Vcc from 1.5V to 5V.

Figure 10A:
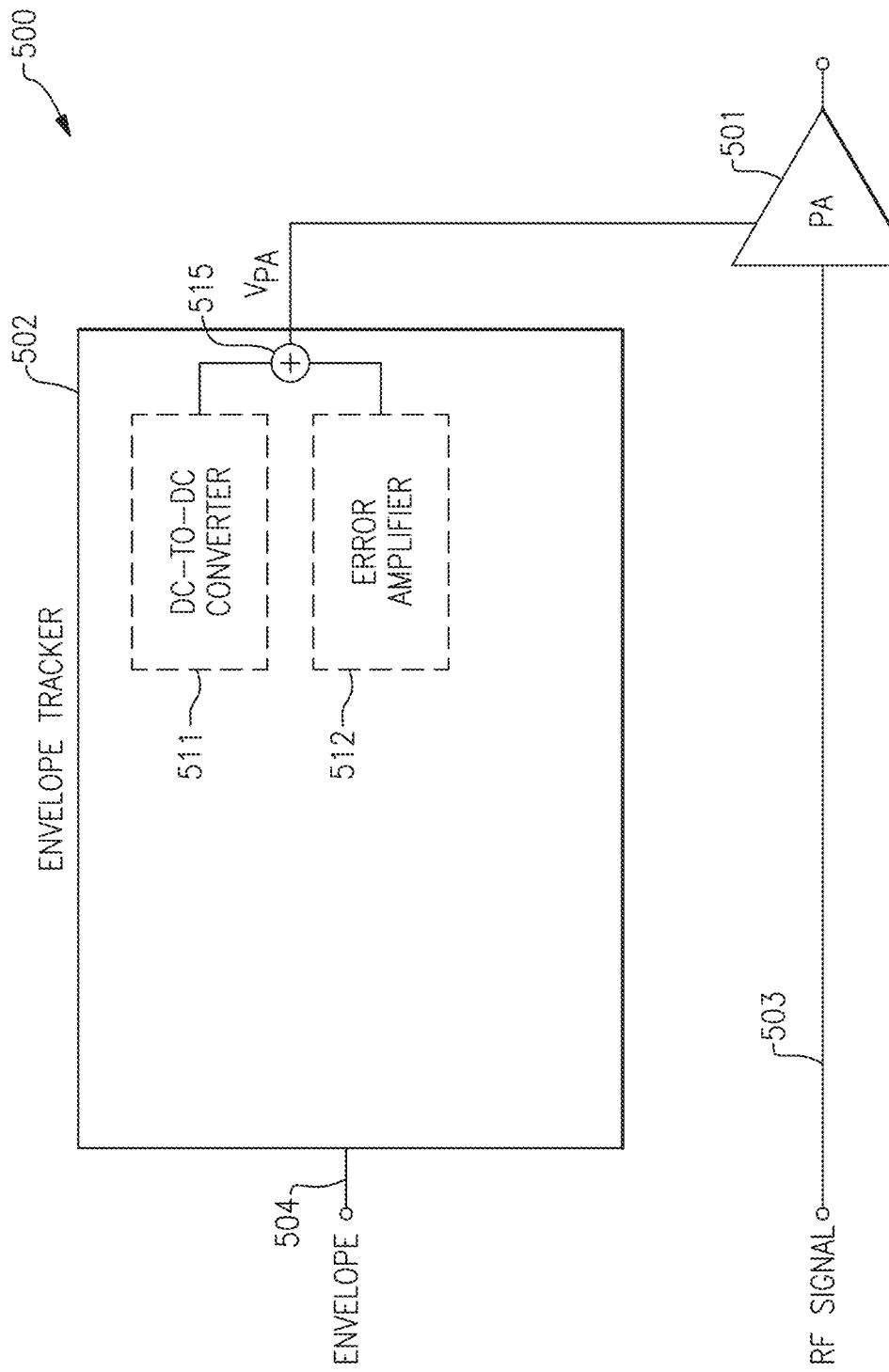
FIG. 10A is a schematic diagram of an envelope tracking system.

FIG. 10A is a schematic diagram of an envelope tracking system 500 according to some embodiments. The envelope tracking system 500 includes a power amplifier 501 and an envelope tracker 502. The power amplifier 501 provides amplification to an incoming radio frequency signal 503.

The envelope tracker 502 receives an envelope signal 504 corresponding to an envelope of the radio frequency signal 503. Additionally, the envelope tracker 502 generates a power amplifier supply voltage VpA, which supplies power to the power amplifier 501.

The illustrated envelope tracker 502 includes a DC-to-DC converter 511 and an error amplifier 512 that operate in combination with one another to generate the power amplifier supply voltage VpA based on the envelope signal 504. In the illustrated embodiment, an output of the DC-to-DC converter 511 and an output of the error amplifier 512 are combined using a combiner 515.

The envelope tracker 502 of FIG. 10A illustrates one example of analog envelope tracking, in which switching regulators can operate in parallel with one another to track an envelope of an RF signal.

Figure 10B:
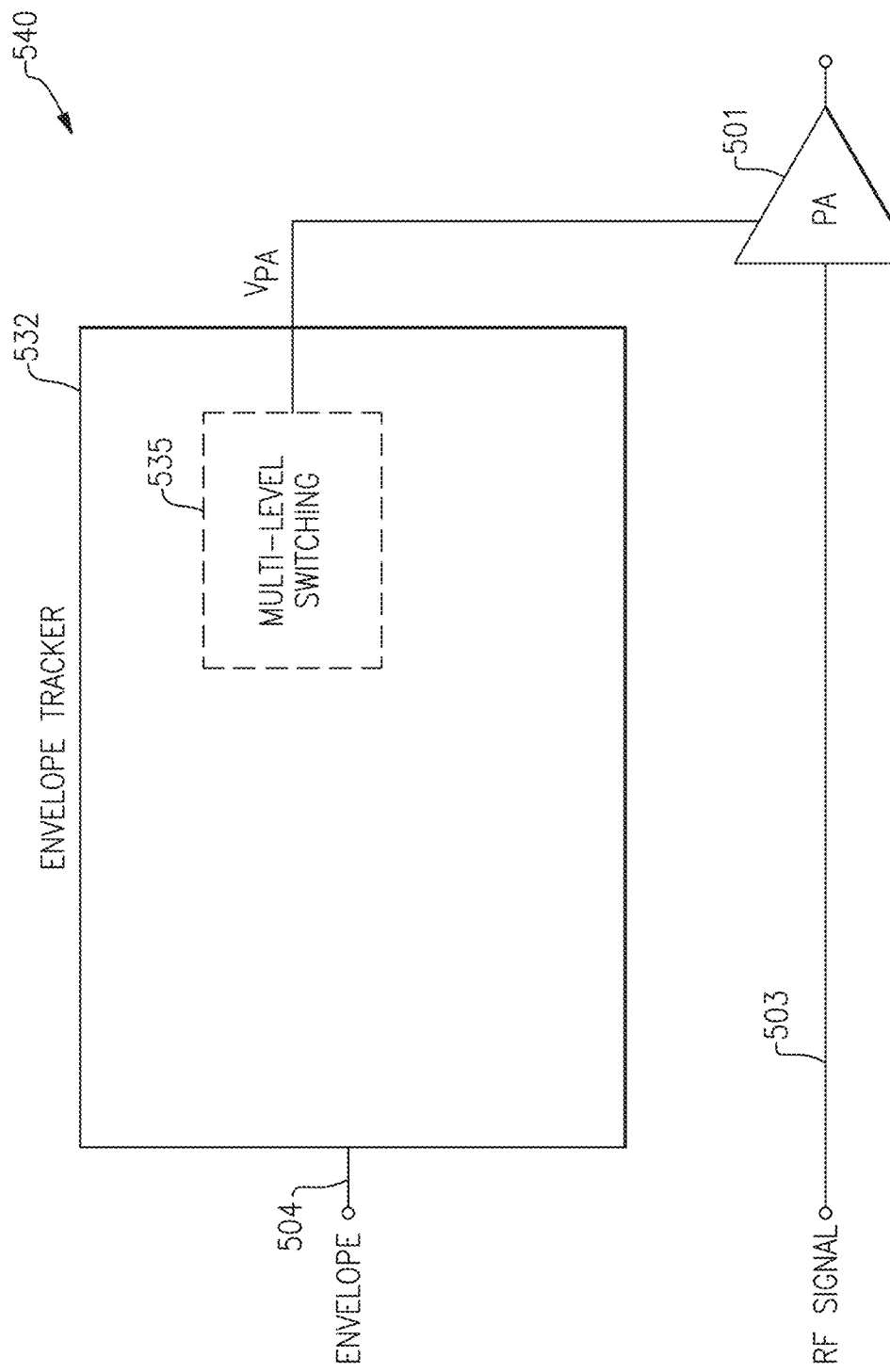
FIG. 10B is a schematic diagram of another envelope tracking system.

FIG. 10B is a schematic diagram of an envelope tracking system 540 according to another embodiment. The envelope tracking system 540 includes a power amplifier 501 and an envelope tracker 532. The power amplifier 501 provides amplification to a radio frequency signal 503.

The envelope tracker 532 receives an envelope signal 504 corresponding to an envelope of the radio frequency signal 503. The envelope tracker 532 generates a power amplifier supply voltage VpA, which supplies power to the power amplifier 501.

The illustrated envelope tracker 532 includes a multi-level switching circuit 535. In certain implementations, the multi-level switching circuit includes a multi-output DC-to-DC converter for generating regulated voltages of different voltage levels, switches for controlling selection of a suitable regulated voltage over time based on the envelope signal, and a filter for filtering the output of the switches to generate the power amplifier supply voltage.

The envelope tracker 532 of FIG. 10B and described here is one example of a device for multi-level switching (MLS) envelope tracking.

Figure 11:
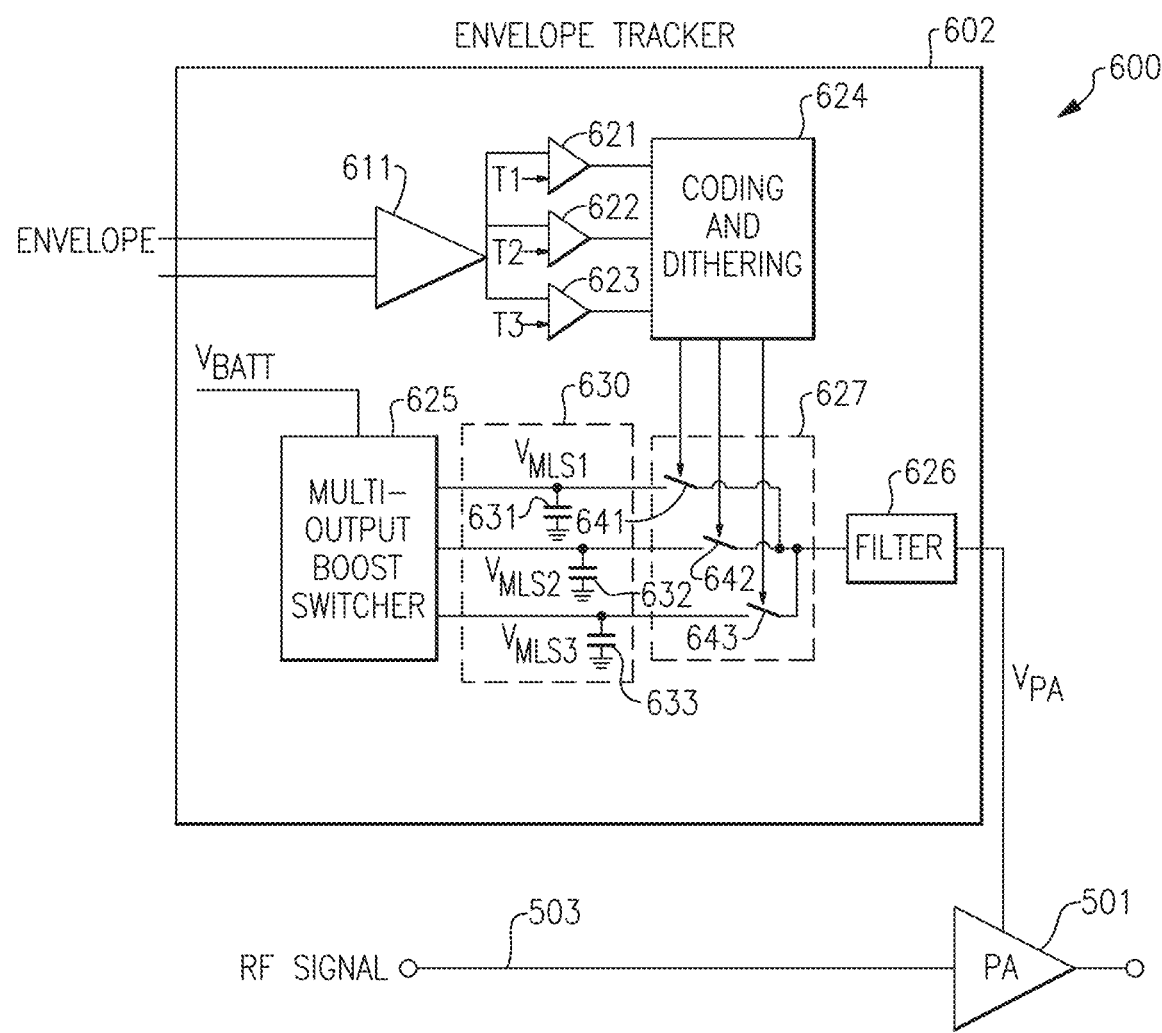
FIG. 11 is a schematic diagram of another envelope tracking system.

FIG. 11 is a schematic diagram of an envelope tracking system 600 according to another embodiment. The envelope tracking system 600 includes a power amplifier 501 and an envelope tracker 602. The power amplifier 501 provides amplification to a radio frequency signal 503.

The envelope tracker 602 receives an envelope signal corresponding to an envelope of the radio frequency signal 503. In this example, the envelope signal is differential. Additionally, the envelope tracker 602 generates a power amplifier supply voltage VPA, which supplies power to the power amplifier 501.

The illustrated envelope tracker 602 includes an envelope amplifier 611, a first comparator 621, a second comparator 622, a third comparator 623, a coding and dithering circuit 624, a multi-output boost switcher 625, a filter 626, a switch bank 627, and a capacitor bank 630. The capacitor bank 630 includes a first capacitor 631, a second capacitor 632, and a third capacitor 633. Additionally, the switch bank 627 includes a first switch 641, a second switch 642, and a third switch 643.

The envelope amplifier 611 amplifies the envelope signal to provide an amplified envelope signal to the first to third comparators 621-623. The first to third comparators 621-623 compare the amplified envelope signal to a first threshold T1, a second threshold T2, and a third threshold T3, respectively. The results of the comparisons are provided to the coding and dithering circuit 624, which processes the results to control selection of switches of the switch bank 627. The coding and dithering circuit 624 can activate the switches while using coding and/or dithering to reduce artifacts arising from opening and closing the switches.

Although an example with three comparators is shown, more or fewer comparators can be used. Furthermore, the coding and dithering circuit 624 can be omitted in favor of controlling the switch bank in other ways. In a first example, coding but not dithering is used. In a second example, dithering but not coding is used. In a third example, neither coding nor dithering is used.

The multi-output boost switcher 625 generates a first regulated voltage VMLS1, a second regulated voltage $V_{MLS2}$, and a third regulated voltage $V_{MLS3}$ based on providing DC-to-DC conversion of a battery voltage $V_{BATT}$. Although an example with three regulated voltages is shown, the multi-output boost switcher 625 can generate more or fewer regulated voltages. In certain implementations, at least a portion of the regulated voltages are boosted relative to the battery voltage $V_{BATT}$ (see FIG. 2). In some configurations, one or more of the regulated voltages is a buck voltage having a voltage lower than the battery voltage $V_{BATT}$.

The capacitor bank 630 aids in stabilizing the regulated voltages generated by the multi-output boost switcher 625. For example, the capacitors 631-633 operate as decoupling capacitors.

The filter 626 processes the output of the switch bank 627 to generate the power amplifier supply voltage VPa By controlling the selection of the switches 641-643 over time based on the envelope signal, the power amplifier supply voltage VpA is generated to track the envelope signal.

Figure 12A:
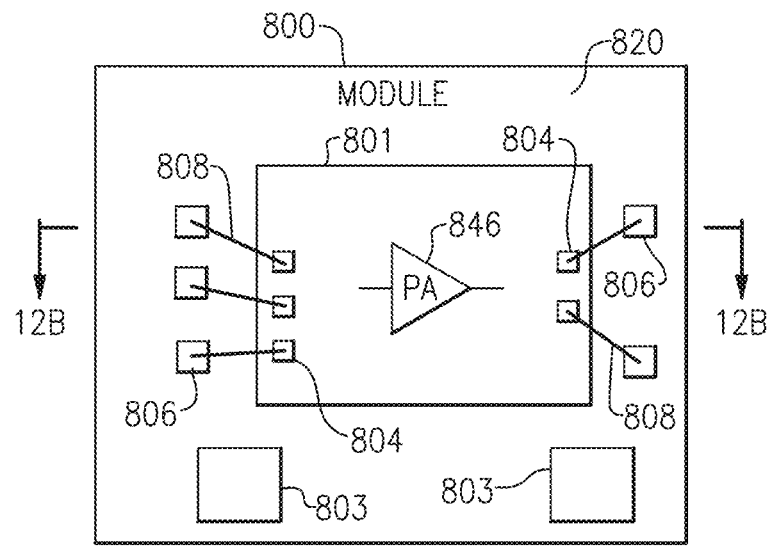
FIG. 12A is a schematic diagram of an embodiment of a packaged module.
Figure 12B:
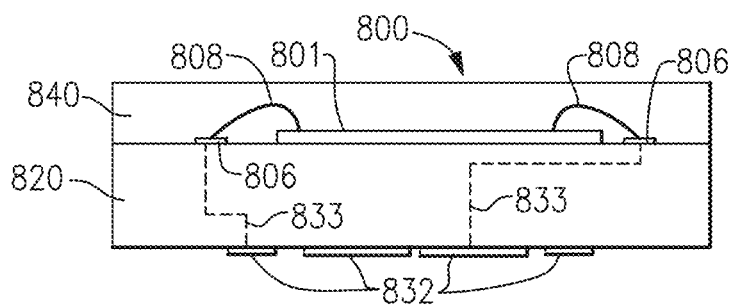
FIG. 12B is a schematic diagram of a cross-section of the packaged module of FIG. 12A taken along the lines 12B-12B.

FIG. 12A is a schematic diagram of one embodiment of a packaged module 800. FIG. 12B is a schematic diagram of a cross-section of the packaged module 800 of FIG. 12A taken along the lines 12B-12B.

The packaged module 800 includes an integrated circuit (IC) or die 801, surface mount components 803, wirebonds 808, a package substrate 820, and encapsulation structure 840. The package substrate 820 includes pads 806 formed from conductors disposed therein. Additionally, the die 801 includes pads 804, and wirebonds 808 are used to electrically connect the pads 804 of the die 801 to the pads 806 of the package substrate 820.

The die 801 includes a power amplifier system (see, e.g., the power amplifier system 400 of FIG. 2), which can be implemented in accordance with any of the embodiments herein.

The packaging substrate 820 can be configured to receive a plurality of components such as the die 801 and the surface mount components 803, which can include, for example, surface mount capacitors and/or inductors.

As shown in FIG. 12B, the packaged module 800 is shown to include a plurality of contact pads 832 disposed on the side of the packaged module 800 opposite the side used to mount the die 801. Configuring the packaged module 800 in this manner can aid in connecting the packaged module 800 to a circuit board such as a phone board of a wireless device. The example contact pads 832 can be configured to provide RF signals, bias signals, power low voltage(s) and/or power high voltage(s) to the die 801 and/or the surface mount components 803. As shown in FIG. 11B, the electrical connections between the contact pads 832 and the die 801 can be facilitated by connections 833 through the package substrate 820. The connections 833 can represent electrical paths formed through the package substrate 820, such as connections associated with vias and conductors of a multilayer laminated package substrate.

In some embodiments, the packaged module 800 can also include one or more packaging structures to, for example, provide protection and/or facilitate handling of the packaged module 800. Such a packaging structure can include overmold or encapsulation structure 840 formed over the packaging substrate 820 and the components and die(s) disposed thereon.

It will be understood that although the packaged module 800 is described in the context of electrical connections based on wirebonds, one or more features of the present disclosure can also be implemented in other packaging configurations, including, for example, flip-chip configurations.

Figure 13:
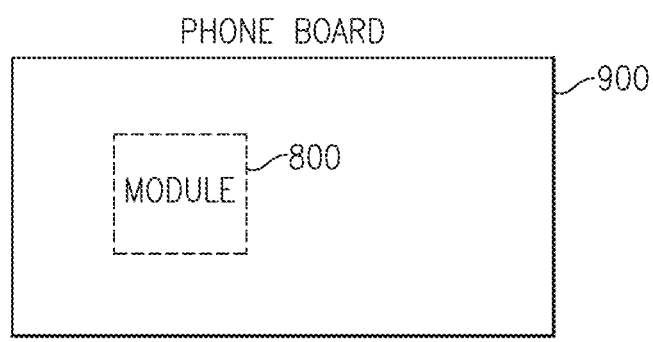
FIG. 13 is a schematic diagram of an embodiment of a phone board.

FIG. 13 is a schematic diagram of an embodiment of a phone board 900. The phone board 900 includes the module 800 shown in FIGS. 12A-12B attached thereto. Although not illustrated in FIG. 13 for clarity, the phone board 800 can include additional components and structures.

Applications

Some of the embodiments described above have provided examples in connection with wireless devices or mobile phones. However, the principles and advantages of the embodiments can be used for any other systems or apparatus that have needs for power amplifiers.

Such envelope trackers can be implemented in various electronic devices. Examples of the electronic devices can include, but are not limited to, consumer electronic products, parts of the consumer electronic products, electronic test equipment, etc. Examples of the electronic devices can also include, but are not limited to, memory chips, memory modules, circuits of optical networks or other communication networks, and disk driver circuits. The consumer electronic products can include, but are not limited to, a mobile phone, a telephone, a television, a computer monitor, a computer, a hand-held computer, a personal digital assistant (PDA), a microwave, a refrigerator, an automobile, a stereo system, a cassette recorder or player, a DVD player, a CD player, a VCR, an MP3 player, a radio, a camcorder, a camera, a digital camera, a portable memory chip, a washer, a dryer, a washer/dryer, a copier, a facsimile machine, a scanner, a multi-functional peripheral device, a wrist watch, a clock, etc. Further, the electronic devices can include unfinished products.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A power amplifier system for amplifying a radio frequency signal, the system comprising:
   a driver transistor coupled to a radio frequency signal input;
   a transformer balun having a main primary coil connected between the driver transistor and a voltage supply node of the power amplifier system, a secondary coil magnetically coupled to the main primary coil, and an additional primary coil configured to generate a feedback signal related to a signal induced in the main primary coil; and
   a neutralization diode configured to use the feedback signal to reduce a gain variation resulting from variations in a voltage supplied from the voltage supply node of the power amplifier system, the neutralization diode connected between the additional primary coil and the driver transistor, the supplied voltage changing in relation to an envelope of the radio frequency signal.

2. The power amplifier system of claim 1 wherein the feedback signal generated in the additional primary coil is a voltage that is equal in magnitude and opposite in phase to a voltage of the main primary coil.

3. The power amplifier system of claim 1 wherein the neutralization diode is configured to neutralize an inter-electrode capacitance generated in the driving transistor based on the feedback signal.

4. The power amplifier system of claim 1 wherein the driver transistor is a bipolar-junction transistor having an emitter connected to a ground voltage, a collector connected to a first end of the main primary coil, and a base connected to the input of the radio frequency signal.

5. The power amplifier system of claim 1 wherein the additional primary coil is connected to a second end of the main primary coil.

6. The power amplifier system of claim 1 wherein the additional primary coil and the main primary coil have the same number of windings.

7. The power amplifier system of claim 1 wherein the neutralization diode has a cathode connected to one end of the additional primary coil and an anode connected to a base of the driver transistor.

8. The power amplifier system of claim 1 wherein the secondary coil includes a tap node at an intermediate point in the secondary coil provided with a DC bias voltage.

9. The power amplifier system of claim 1 further comprising a push-pull amplifier having a first transistor having a base connected to a first end of the secondary coil and a second transistor having a base connected to a second end of the secondary coil.

10. The power amplifier system of claim 9 wherein the push-pull amplifier includes a first cross-coupling diode having one end connected to the base of the first transistor and the other end connected to a collector of the second transistor; and a second cross-coupling diode having one end connected to the base of the second transistor and the other end connected to a collector of the first transistor.

11. The power amplifier system of claim 9 further comprising a second transformer balun having a tertiary coil coupled to the push-pull amplifier and a quaternary coil coupled to an output node of the power amplifier system.

12. The power amplifier system of claim 11 wherein the tertiary coil has a tap at a center of the tertiary coil that is connected to the voltage supply node.

13. A radio frequency module comprising:
a packaging substrate configured to receive a plurality of components;
a power amplifier system implemented on the packaging substrate, the power amplifier system including a driver transistor coupled to an input of the radio frequency signal;
a transformer balun having a main primary coil connected between the driver transistor and a voltage supply node of the power amplifier system, a secondary coil magnetically coupled to the main primary coil, and an additional primary coil configured to generate a feedback signal related to a signal induced in the main primary coil; and
a neutralization diode configured to, based on the feedback signal, reduce a gain variation of the power amplifier system that depends on a supplied voltage, the neutralization diode connected between the additional primary coil and the driver transistor, the neutralization diode further configured to use the feedback signal to neutralize an inter-electrode capacitance generated in the driving transistor, and the neutralization diode having a cathode connected to one end of the additional primary coil and an anode connected to a base of the driver transistor.

14. The radio frequency module of claim 13 wherein the supplied voltage supplied through the voltage supply node changes in relation to an envelope of the radio frequency signal.

15. The radio frequency module of claim 13 wherein the additional primary coil is configured to generate a feedback signal in the form of a voltage that is equal in magnitude and opposite in phase to a voltage of the main primary coil.

16. The radio frequency module of claim 13 wherein the driver transistor is a bipolar-junction transistor having an emitter connected to a ground voltage, a collector connected to a first end of the main primary coil, and a base connected to the input of the radio frequency signal.

17. The radio frequency module of claim 13 wherein the additional primary coil and the main primary coil have an identical number of windings, and the secondary coil includes a tap node at a center of the secondary coil that provides a DC bias voltage.

18. The radio frequency module of claim 13, wherein the power amplifier system further includes a push-pull amplifier having a first transistor having a base connected to a first end of the secondary coil and a second transistor having a base connected to a second end of the secondary coil.

19. The radio frequency module of claim 18 wherein the push-pull amplifier includes a first cross-coupling diode having one end connected to the base of the first transistor and the other end connected to a collector of the second transistor; and a second cross-coupling diode having one end connected to the base of the second transistor and the other end connected to a collector of the first transistor.

20. The radio frequency module system of claim 18 wherein the amplifier system further includes a second transformer balun having a tertiary coil coupled to the push-pull amplifier and a quaternary coil coupled to an output node of the power amplifier system, and the tertiary coil has a tap at an intermediate position in the tertiary coil, the tap connected to the voltage supply node.

21. A mobile device comprising:
a transceiver configured to generate a radio frequency signal;
a power management system including an envelope tracker configured to generate a power amplifier supply voltage that changes is relation to an envelope of the radio frequency signal; and
a front end module including a power amplifier system including a driver transistor coupled to an input of the radio frequency signal; a transformer balun having a main primary coil connected between the driver transistor and a voltage supply node of the power amplifier system, a secondary coil magnetically coupled to the main primary coil, and an additional primary coil configured to generate a feedback signal related to a signal induced in the main primary coil; and a neutralization diode configured to reduce a gain variation of the power amplifier system depending on a supplied voltage, based on the feedback signal, and the neutralization diode connected between the additional primary coil and the driver transistor.

* * * * *